United States Patent
Adachi

(10) Patent No.: US 7,809,493 B2
(45) Date of Patent: Oct. 5, 2010

(54) STOP POSITION CONTROL APPARATUS FOR INTERNAL COMBUSTION ENGINE

(75) Inventor: Noriyasu Adachi, Numazu (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 317 days.

(21) Appl. No.: 12/086,002

(22) PCT Filed: Feb. 9, 2007

(86) PCT No.: PCT/JP2007/052799

§ 371 (c)(1),
(2), (4) Date: Jun. 4, 2008

(87) PCT Pub. No.: WO2007/091735

PCT Pub. Date: Oct. 8, 2007

(65) Prior Publication Data

US 2009/0248282 A1    Oct. 1, 2009

(30) Foreign Application Priority Data

Feb. 9, 2006    (JP) ............................. 2006-032506

(51) Int. Cl.
*B60T 7/12* (2006.01)
*G06F 19/00* (2006.01)

(52) U.S. Cl. ...................................... 701/112; 701/115

(58) Field of Classification Search ................. 701/112, 701/114, 115; 123/179.3, 179.4, 179.18
See application file for complete search history.

(56) References Cited

U.S. PATENT DOCUMENTS

| | | | |
|---|---|---|---|
| 7,027,911 B2* | 4/2006 | Nishikawa et al. | 701/112 |
| 7,177,755 B2* | 2/2007 | Nishikawa et al. | 701/112 |
| 7,739,018 B2* | 6/2010 | Adachi | 701/58 |
| 2004/0149251 A1* | 8/2004 | Nishikawa et al. | 123/198 DB |
| 2004/0255904 A1 | 12/2004 | Izawa et al. | |

FOREIGN PATENT DOCUMENTS

| | | |
|---|---|---|
| EP | 1 555 411 A1 | 7/2005 |
| JP | 58-018535 | 2/1983 |
| JP | 02-305342 | 12/1990 |
| JP | 2004-293444 A | 10/2004 |
| JP | 2005-016505 A | 1/2005 |
| JP | 2005-330837 A | 12/2005 |

* cited by examiner

*Primary Examiner*—John T Kwon
(74) *Attorney, Agent, or Firm*—Kenyon & Kenyon LLP

(57) ABSTRACT

An engine model is configured so as to include a crankshaft periphery motion equations computing block, a friction model, an intake air pressure estimation model, an in-cylinder pressure estimation model, a combustion waveform calculation block, an atmospheric pressure correction term calculation block, and an atmospheric temperature correction term calculation block. While combustion is cut off, the friction model is learned and updated using estimated relating to the crank stop position calculated by the engine model and measured data relating to the crank stop position.

3 Claims, 9 Drawing Sheets

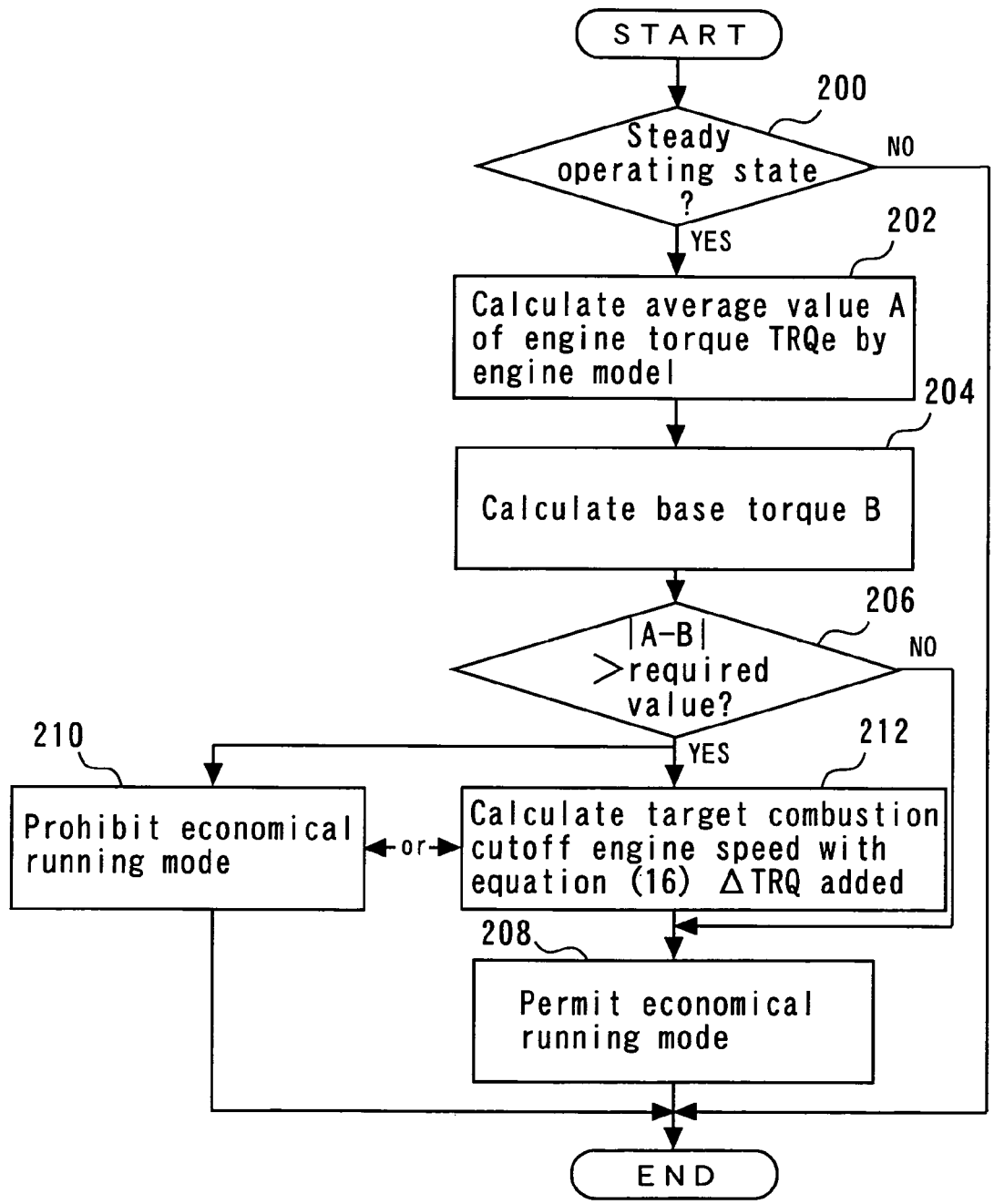

STOP POSITION CONTROL APPARATUS FOR INTERNAL COMBUSTION ENGINE

This is a 371 national phase application of PCT/JP2007/052799 filed 9 Feb. 2007, claiming priority to Japanese Patent Application No. 2006-032506 filed 9 Feb. 2006, the contents of which are incorporated herein by reference.

TECHNICAL FIELD

The present invention relates generally to apparatus for controlling a stop position of an internal-combustion engine. More particularly, the invention concerns a stop position control apparatus for an internal-combustion engine, the apparatus applying a control scheme adapted to stop and restart an internal-combustion engine automatically after a temporary stop of an associated motor vehicle.

BACKGROUND ART

Japanese Patent Application Laid-Open Publication No. 2004-293444 (Patent Document 1) discloses, as a conventional apparatus, an engine starter that executes control (economical running control) to stop and restart an internal-combustion engine automatically after an associated motor vehicle has come to a temporary stop. In order to smoothly restart the internal-combustion engine, this conventional apparatus is intended to optimize a stop position of a piston (a stop position of a crankshaft) during the automatic stop of the internal-combustion engine by controlling an engine speed at which the vehicle is to be made to stop supplying a fuel.

Also, Japanese Patent Application Laid-Open Publication No. 2005-16505 (Patent Document 2) discloses a vehicle drive control apparatus of a hybrid motor vehicle that uses an internal-combustion engine and a motor to drive the vehicle. This conventional apparatus uses a detected value of a crank angle (actual crank angle) to correct a target speed (target combustion cutoff engine speed) required to stop the internal-combustion engine with a crankshaft being stopped at a desired stop position. Patent Document 2 describes the fact that even if there is a variation in internal friction of the internal-combustion engine or in temperature or viscosity of lubricating oil and cooling oil due to correcting the target speed, the apparatus can stop the internal-combustion engine at the desired stop position.

Including the above-mentioned document, the applicant is aware of the following document as a related art of the present invention.

[Patent Document 1] Japanese Laid-Open Patent Application Publication No. 2004-293444

[Patent Document 2] Japanese Laid-Open Patent Application Publication No. 2005-16505

[Patent Document 3] Japanese Laid-Open Patent Application Publication No. Hei 02-305342

[Patent Document 3] Japanese Laid-Open Patent Application Publication No. Sho 58-18535

DISCLOSURE OF INVENTION

When an internal-combustion engine is automatically stopped, a stop position of a crankshaft may be deviated from a desired position. a plurality of factors such as the above-mentioned variation in friction are considered. In Patent Document 1, however, consideration is not given to such a plurality of factors causing the stop position of the crankshaft to deviate from a desired position. In addition, according to Patent Document 2, although consideration is given to the causes of the deviation, since the desired stop position is adjusted considering various factors all together, control of the crank stop position is considered to be low in accuracy and in convergence.

The present invention was made to solve the abovementioned problems, and an object of the invention is to provide an apparatus which applies a control scheme adapted to stop and restart an internal-combustion engine automatically and which is capable of estimating a stop position of a crankshaft accurately in the internal-combustion engine.

The above object is achieved by a stop position control apparatus for an internal-combustion engine which includes a friction model which calculates a friction of the internal-combustion engine. The apparatus corrects a stop position of a crankshaft on the basis of the calculated friction.

In a second aspect of the present invention, the apparatus may be adapted to control a stop position of a crankshaft by controlling a combustion cutoff engine speed at which combustion of an internal-combustion engine is to be stopped. Crank stop position calculating means may be provided for calculating an estimated value of the stop position of the crankshaft on the basis of required parameters including the friction. The crank stop position calculating means may correct the estimated value of the stop position of the crankshaft on the basis of the friction calculated by the friction model.

The third aspect of the present invention may include crank stop position judging means for judging the stop position of the crankshaft. If it is judged that the stop position of the crankshaft is outside a required error range, the apparatus may learn the friction model and updates the friction model, on the basis of a deviation between an estimated value of the stop position of the crankshaft and a measured value of the stop position of the crankshaft.

In a fourth aspect of the present invention, the apparatus may be adapted to control a stop position of a crankshaft by controlling a combustion cutoff engine speed at which combustion of an internal-combustion engine is to be stopped. Target combustion cutoff engine speed calculating means may be provided for calculating a target value of the combustion cutoff engine speed on the basis of required parameters including the friction. The target combustion cutoff engine speed calculating means may correct the target value on the basis of the friction calculated by the friction model.

The fifth aspect of the present invention may include temperature difference judging means for judging a difference between a temperature of cooling water and a temperature of lubricating oil. Friction error calculating means may be provided for calculating a friction error associated with the temperature difference. If it is judged that the cooling water temperature and the lubricating oil temperature differ from each other, the apparatus may correct the friction model on the basis of the friction error.

In a sixth aspect of the present invention, if it is judged that the cooling water temperature and the lubricating oil temperature differ from each other, the apparatus may prohibit control of the stop position of the crankshaft.

According to a first aspect of the present invention, a stop position of a crankshaft can be controlled accurately since effects on accuracy of the crank stop position can be taken into consideration for each of factors which affect the accuracy of the crank stop position.

According to a second aspect of the present invention, a stop position control apparatus capable of performing highly efficient arithmetic operations can be realized since data on a stop position of a crankshaft can be estimated while effects on accuracy of the crank stop position are being taken into consideration for each of factors which affect the accuracy of the crank stop position.

According to a third aspect of the present invention, an improvement of the accuracy of estimating a stop position of a crankshaft and highly efficient arithmetic operations can be achieved since only effects on the friction significantly influential on the stop position of the crankshaft can be learned and updated.

According to a fourth aspect of the present invention, a stop position control apparatus capable of performing highly efficient arithmetic operations can be realized since a target value of an engine speed required to stop combustion (hereinafter referred to as a "combustion cutoff engine speed") can be obtained while effects on accuracy of a stop position of a crankshaft can be taken into consideration for each of factors which affect the accuracy of the crank stop position.

According to a fifth aspect of the present invention, more accurate estimation of a stop position of a crankshaft is possible since consideration can be paid to the fact that friction is influenced by a temperature of cooling water and a temperature of lubricating oil.

According to a sixth aspect of the present invention, high controllability of a stop position of a crankshaft can be obtained since, if it is judged that friction is inaccurately estimated, control of the crank stop position is prohibited.

BRIEF DESCRIPTION OF DRAWINGS

FIG. 11 is a flowchart of a routine executed by the ECU according to the second embodiment of the present invention.

BEST MODE FOR CARRYING OUT THE INVENTION

First Embodiment

System Configuration According to First Embodiment

Figure 1:
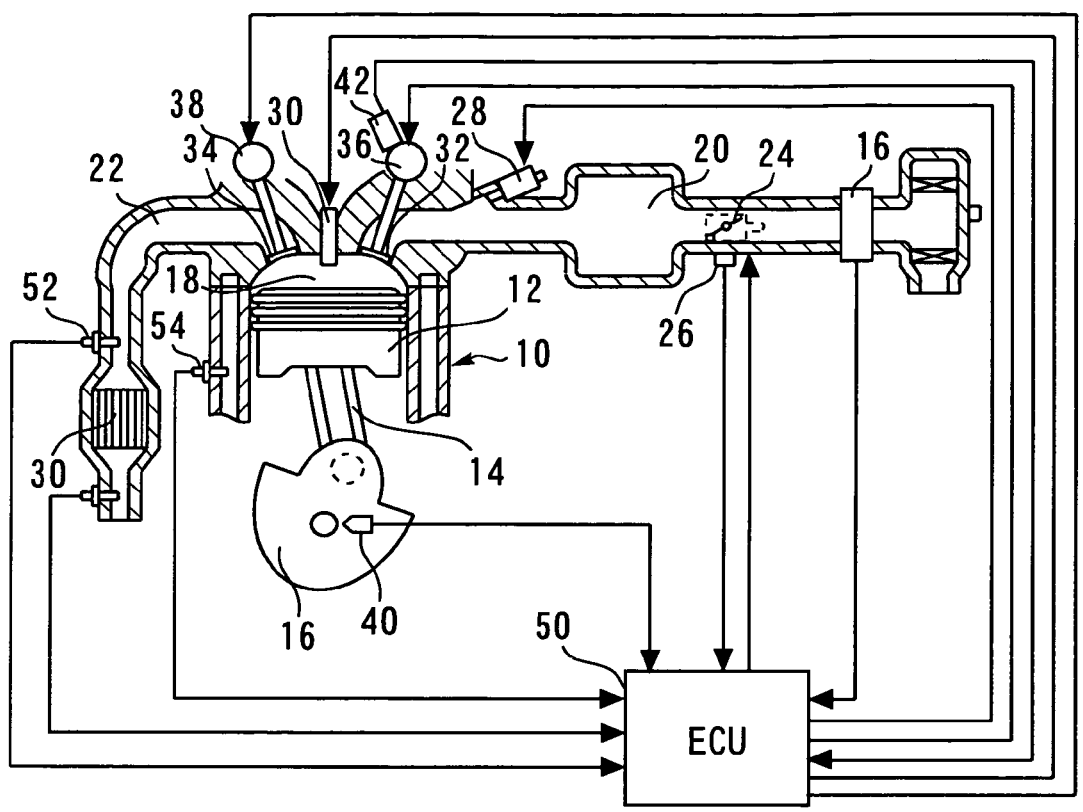
FIG. 1 is a diagram explaining a configuration of an internal-combustion engine to which a stop position control apparatus for an internal-combustion engine is applied as a first embodiment of the present invention.

FIG. 1 is a diagram explaining a configuration of an internal-combustion engine 10 to which a stop position control apparatus for an internal-combustion engine is applied as a first embodiment of the present invention. The system of the present embodiment includes the internal-combustion engine 10. Also, the present embodiment assumes an inline four-cylinder engine as the internal-combustion engine 10. Each of cylinders of the internal-combustion engine 10 contains a piston 12. The piston 12 is coupled with a crankshaft 16 via a connecting rod 14. Each of the cylinders of the internal-combustion engine 10 also has a combustion chamber 18 formed atop the piston 12. An air intake passageway 20 and an exhaust passageway 22 are communicated with the combustion chamber 18.

The air intake passageway 20 includes a throttle valve 24. The throttle valve 24 is an electronically controlled throttle valve that can control an open position of the throttle valve independently of an open position of an accelerator. A throttle position sensor 26 that detects an open position TA of the throttle is disposed near the throttle valve 24. A fuel injection valve 28 for injecting a fuel into an air intake port is disposed downstream with respect to the throttle valve 24. At a cylinder head of the internal-combustion engine, an ignition plug 30 is mounted for each cylinder in such a form as to project from an upper section of the combustion chamber 18 into the combustion chamber 18. An air intake valve 32 and an exhaust valve 34 are provided at the air intake port and an exhaust port, respectively. The air intake valve 32 establishes continuity or discontinuity between the combustion chamber 18 and the air intake passageway 20, and the exhaust valve 34 establishes continuity or discontinuity between the combustion chamber 18 and the exhaust passageway 22.

The intake valve 32 and the exhaust valve 34 are driven by an intake variable valve timing (VVT) control mechanism 36 and an exhaust variable valve timing (VVT) control mechanism 38, respectively. The intake variable valve timing (VVT) control mechanism 36 and the exhaust variable valve timing (VVT) control mechanism 38 can open and close the intake valve 32 and the exhaust valve 34, respectively, in synchronization with rotation of the crankshaft 16. The VVT control mechanisms can also change respective valve-opening characteristics (such as valve-opening timing, operating angle, and valve lift amount) of the intake and exhaust valves.

The internal-combustion engine 10 has a crank angle sensor 40 near the crankshaft 16. The crank angle sensor 40 reverses a high-level ("Hi") output state and a low-level ("Lo") output state each time the crankshaft 16 rotates a required angle. A rotation position of the crankshaft 16 and a rotation speed thereof (i.e., engine speed, "Ne") can be detected according to an output of the crank angle sensor 40. The internal-combustion engine 10 also has a cam angle sensor 42 near an air intake camshaft. The cam angle sensor 42 has essentially the same configuration as that of the crank angle sensor 40. A rotation position (advance value) and other factors of the intake camshaft can be detected according to an output of the cam angle sensor 42.

The system shown in FIG. 1 also includes an electronic control unit (ECU) 50. In addition to the various sensors described above, an air/fuel ratio sensor 52 for detecting an internal exhaust air/fuel ratio of the exhaust passageway 22, and a water temperature sensor 54 for detecting a temperature of cooling water in the internal-combustion engine 10 are electrically connected to the ECU 50. Furthermore, the various actuators described above are electrically connected to the ECU 50. The ECU 50 can control an operational state of the internal-combustion engine 10 on the basis of outputs of the various sensors and on the basis of results calculated using an engine model 60 virtually configured in the ECU 50.

[Outline of the Engine Model]

Figure 2:
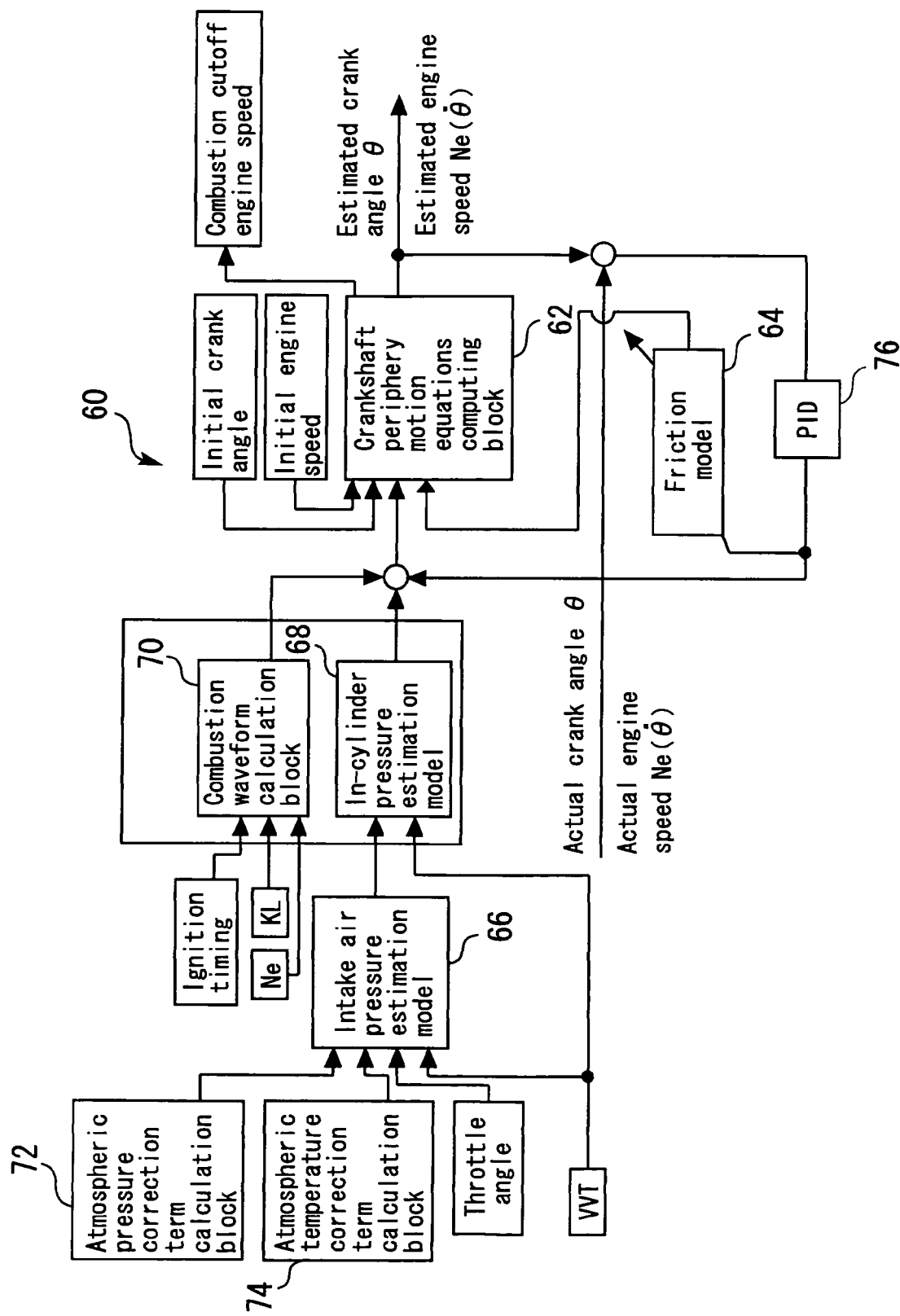
FIG. 2 is a block diagram showing a configuration of the engine model configured in the ECU of FIG. 1.

FIG. 2 is a block diagram showing a configuration of the engine model 60 configured in the ECU 50 of FIG. 1. As shown in FIG. 2, the engine model 60 includes a crankshaft periphery motion equations computing block 62, a friction model 64, an intake air pressure estimation model 66, an in-cylinder pressure estimation model 68. a combustion waveform calculation block 70, an atmospheric pressure correction term calculation block 72, and an atmospheric temperature correction term calculation block 74. A detailed structural description of these sections is given below.

(1) Description of the Crankshaft Periphery Motion Equations Computing Block

The crankshaft periphery motion equations computing block 62 calculates estimated values of a crank angle θ and an engine speed "Ne", that is, a crank angular rotation speed dθ/dt. The crankshaft periphery motion equations computing block 62 receives an in-cylinder pressure P of the internal-combustion engine 10 from the in-cylinder pressure estimation model 68 or the combustion waveform calculation block 70. During a start of the computation, the crankshaft periphery motion equations computing block 62 also receives an initial crank angle "θ0" and an initial engine speed "Ne0".

The estimated crank angle θ and the estimated engine speed "Ne", both calculated by the crankshaft periphery motion equations computing block 62, are subjected to feedback control by a PID controller 76 shown in FIG. 2, in order to compensate for a deviation with an actual crank angle θ and an actual engine speed "Ne", respectively. Effects relating to internal friction of the internal-combustion engine 10 are incorporated by the friction model 64 into results calculated by the crankshaft periphery motion equations computing block 62.

Next, further details of the computation executed within the crankshaft periphery motion equations computing block 62 are described below.

Figure 3:
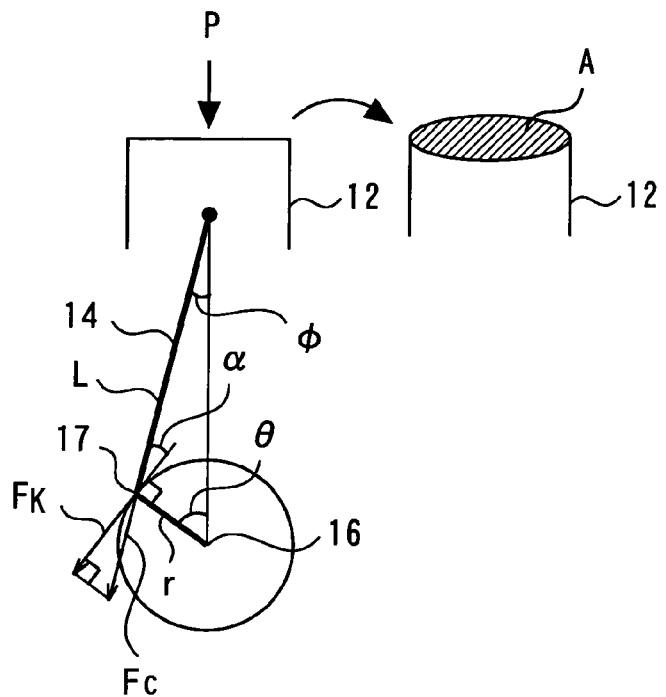
FIG. 3 is a diagram that shows reference numbers and symbols assigned to peripheral constituent elements of the crankshaft.

FIG. 3 is a diagram that shows reference numbers and symbols assigned to peripheral constituent elements of the crankshaft 16. As shown in FIG. 3, the present embodiment assumes that an upper end of the piston 12 undergoing the in-cylinder pressure P has a surface area of A. Also, length of the connecting rod 14 is taken as L, and a rotational radius of the crank, as "r". In addition, an angle formed between a virtual line (cylinder axial line) connecting a piston-installed point of the connecting rod 14 and an axial center of the crankshaft 16, and an axial line of the connecting rod 14, is taken as f (hereinafter referred to as a "connecting rod angle f"). Furthermore, an angle formed between the cylinder axial line and an axial line of a crank pin 17 is taken as θ.

Since the internal-combustion engine 10 with four cylinders has a phase difference of 180° CA in terms of crank angles among the cylinders, a relationship in crank angle between the cylinders can be defined as in Equation (1a). In addition, since crank angular rotation speeds of the cylinders, dθ/dt, are obtained by differentiating the crank angles θ of each cylinder with respect to time, each angle can be expressed as in Equation (1b).

$$\theta_1 = \theta, \theta_2 = \theta + \pi, \theta_3 = \theta + 2\pi, \theta_4 = \theta + 3\pi \tag{1a}$$

$$\dot\theta = \dot\theta_1, \dot\theta = \dot\theta_2, \dot\theta = \dot\theta_3, \dot\theta = \dot\theta_4 \tag{1b}$$

$$\left(\dot\theta = \frac{d\theta}{dt}\right)$$

Reference numbers 1 to 4 that are assigned to the crank angle θ and crank angular rotation speed dθ/dt in the above Equations (1a) and Equation (1b) correspond to the order of combustion in each cylinder in accordance with a required explosion order of the internal-combustion engine 10. Also, reference numbers 1 to 4 may be represented by "i" in the following expressions.

Additionally, in the piston crank mechanism shown in FIG. 3, crank angle θi and connecting rod angle fi have the relationship expressed by Equation (2) below.

$$\sin(\phi_i) = \frac{r}{L}\sin(\theta_i), \cos(\Phi_i) = \sqrt{1 - \left(\frac{r}{L}\right)^2 \sin^2(\theta_i)}, \tag{2}$$

$$\dot X_i = r \cdot \sin(\theta_i) \left\{ 1 + \frac{\frac{r}{L}\cos(\theta_i)}{\sqrt{1 - \left(\frac{r}{L}\right)^2 \sin^2(\theta_i)}} \right\} \dot\theta_i$$

$$(\dot X i = dXi/dt)$$

where "dXi/dt" denotes a piston speed.

Furthermore, total kinetic energy of the crankshaft periphery can be expressed as in Equation (3). Developing Equation (3) allows various parameters in each term of Equation (3) to be expressed with a coefficient of ½(dθ/dt)². Here, the coefficient that has thus been obtained is expressed as a function f(θ) of the crank angle θ.

$$T = \frac{1}{2}(l_k + l_{fl} + l_{mi})\dot\theta^2 + \sum_{i=1}^{4}\frac{1}{2}(m_p + m_c)\dot x_i^2 + \sum_{i=1}^{4}\frac{1}{2}l_c\dot\Phi_i^2 \tag{3}$$

$$= \frac{1}{2}\begin{bmatrix}(l_k + l_{fl} + l_{mi}) + (m_p + m_c)r^2 \cdot \\ \sum_{i=1}^{4}\sin^2(\theta_i) \cdot \\ \left\{1 + \frac{\frac{r}{L}\cos(\theta_i)}{\sqrt{1-\left(\frac{r}{L}\right)^2\sin^2(\theta_i)}}\right\}^2 + \\ l_c\left(\frac{r}{L}\right)^2 \cdot \sum_{i=1}^{4}\frac{\cos^2(\theta_i)}{1-\left(\frac{r}{L}\right)^2\sin^2(\theta_i)}\end{bmatrix} \cdot \dot\theta^2$$

$$= \frac{1}{2} \cdot f(\theta) \cdot \dot\theta^2$$

The first term on the right side of Equation (3) is equivalent to kinetic energy relating to a rotary motion of the crankshaft 16, the second term on the right side, to kinetic energy relating to rectilinear motions of the piston 12 and connecting rod 14, and the third term on the right side, to kinetic energy relating to a rotary motion of the connecting rod 14. Also, "Ik" in Equation (3) denotes an inertial moment of the crankshaft 16 around a rotational axis thereof, and "Ifl" is an inertial moment of a flywheel around a rotational axis thereof. Additionally, "Imi" denotes an inertial moment of a rotating section including a transmission (i.e., a transmission, a drive shaft, tires, and other elements combined with the internal-combustion engine 10) around a rotational axis of the rotating section, and "Ic" an inertial moment of a connecting rod 14. Furthermore, "mp" denotes a displacement of the piston 12, and "mc" a displacement of the connecting rod 14.

Next, Lagrangian L is defined as a deviation between the total kinetic energy T and potential energy U of the system, as in Equation (4a). If an input torque acting on the crankshaft 16 is taken as TRQ, the Lagrange's equations of motion can be used to express a relationship among the Lagrangian L, the crank angle θ, and the input torque TRQ, as in Equation (4b).

$$L = T - U \tag{4a}$$

$$\frac{d}{dt}\frac{\partial L}{\partial \dot{\theta}} - \frac{\partial L}{\partial \theta} = TRQ \tag{4b}$$

$$\frac{\partial L}{\partial \dot{\theta}} = f(\theta)\dot{\theta}, \quad \frac{d}{dt}\frac{\partial L}{\partial \dot{\theta}} = \frac{d}{dt}\frac{\partial f(\theta)}{\partial \theta}\dot{\theta}^2 + f(\theta)\ddot{\theta} \tag{4c}$$

$$\frac{\partial L}{\partial \theta} = \frac{1}{2}\frac{\partial f(\theta)}{\partial \theta}\dot{\theta}^2 \tag{4d}$$

$$\therefore \frac{d}{dt}\frac{\partial L}{\partial \dot{\theta}} - \frac{\partial L}{\partial \theta} = TRQ \Leftrightarrow f(\theta)\ddot{\theta} + \frac{1}{2}\frac{\partial f(\theta)}{\partial \theta}\dot{\theta}^2 = TRQ \tag{4e}$$

In equation (4a), since an influence of the potential energy U is insignificant compared with that of the kinetic energy T, the former influence can be ignored. The first term on the left side of equation (4b) can be expressed as a function of the crank angle θ as in Equation 4C by time-differentiating a value obtained by partially differentiating Equation (3) with respect to the crank angular rotation speed (dθ/dt). Also, the second term on the left side of Equation 4B can be expressed as a function of the crank angle θ as in equation (4d) by partially differentiating Equation (3) with respect to the crank angle θ.

Equation (4b) can therefore be rewritten as in equation (4e), and thus a relationship between the crank angle θ and the input torque TRQ can be obtained. Also, the input torque TRQ here is defined as a value having three parameters, as in equation (5).

$$TRQ = TRQ_e - TRQ_L - TRQ_f \tag{5}$$

In above Equation (5), TRQe is a torque occurring in the engine. More specifically, TRQe is a torque which acts on the crankshaft 16 from the piston 12 undergoing a gas pressure (in-cylinder pressure P). Also, TRQL is a load torque, which is stored within the ECU 50 as a known value varying according to particular characteristics of the vehicle in which the internal-combustion engine 10 is mounted. In addition, TRQf is a friction torque, that is, a torque corresponding to total friction losses in sliding sections such as the piston 12 and crankshaft 16. The friction torque TRQf is a value obtained from the friction model 64.

Next, the engine torque TRQe can be calculated in accordance with Equations (6a) to (6c). That is to say, first, force Fc acting on the connecting rod 14 due to in-cylinder pressure P can be expressed as an axially linear direction component of the connecting rod 14 of force PA acting on the upper end of the piston 12. Equation (6a) expresses the force Fc. Since, as shown in FIG. 3, an angle a formed between the axial line of the connecting rod 14 and a tangent of a moving path of the crank pin 17 is {π/2−(φ+θ)}, force Fk acting in a tangential direction of the moving path of the crank pin 17 due to in-cylinder pressure P can be expressed using the force Fc exerted on the connecting rod 14. Equation (6b) expresses the force Fk. The engine torque TRQe is a product of the force Fk acting in the tangential direction of the moving path of the crank pin 17, and the rotational radius "r" of the crank. Equations (6a) and (6b) can therefore be used to express Fk as in equation (6c).

$$F_c = P \cdot A \cos(\phi) \tag{6a}$$

$$F_k = F_c \sin(\Phi + \theta) \tag{6b}$$

$$\therefore TRQ_e = F_k \cdot r \tag{6c}$$
$$= P \cdot A \cdot r \cdot \cos(\Phi)\sin(\Phi + \theta)$$
$$= P \cdot A \cdot r \cdot \left[\left\{1 - \left(\frac{r}{L}\right)^2 \sin^2(\theta)\right\} + \frac{r}{L}\cos(\theta)\right]\sin(\theta)$$

According to the configuration of the crankshaft periphery motion equations computing block 62, the input torque TRQ can be obtained in accordance with Equations (6c) and (5) by acquiring the in-cylinder pressure P with the in-cylinder pressure estimation model 68 or the combustion waveform calculation block 70. This makes it possible to obtain the crank angle θ and the crank angular rotation speed dθ/dt by solving Equation (4e).

(2) Description of the Friction Model

Figure 4:
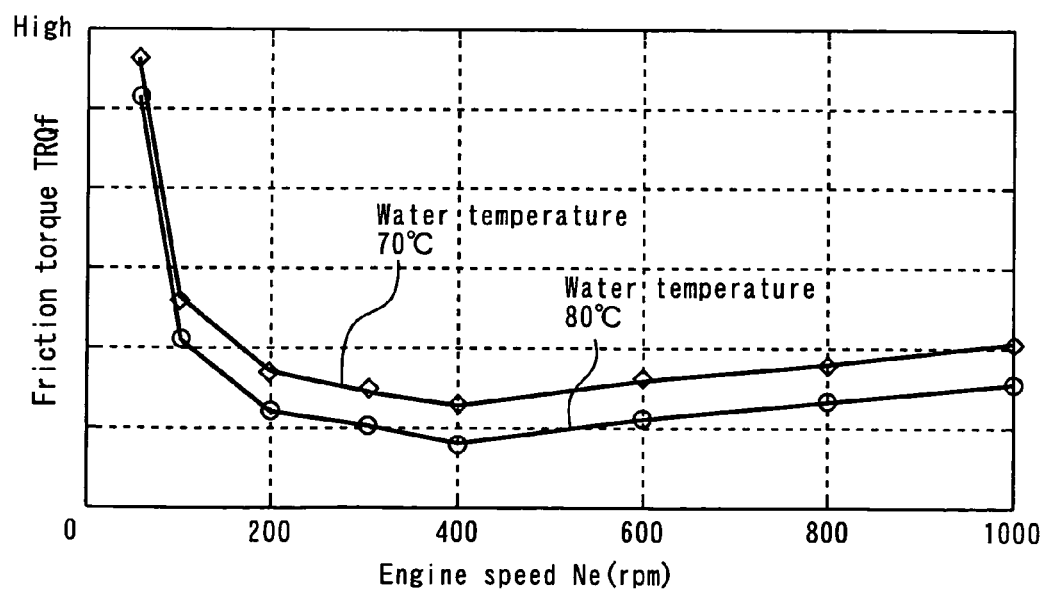
FIG. 4 shows an example of a friction map which the friction model of FIG. 2 includes for acquiring the friction torque TRQf.

FIG. 4 shows an example of a friction map which the friction model 64 of FIG. 2 includes for acquiring the friction torque TRQf. In the graph of FIG. 4, the friction torque TRQf is defined under a relationship between the engine speed "Ne" and a temperature of the engine cooling water. Such characteristics shown in the graph are specified by experiments conducted in advance, etc., and the friction torque TRQf tends to increase with decreases in the temperature of the engine cooling water.

It has been described above in the present embodiment that such a graph (friction map) as described above is included in the friction model 64 in order to reduce a calculation load of the ECU 50. A configuration of the friction model, however, is not limited to or by the above description and may use a relational expression such as equation (7). Equation (7) is configured so that the friction torque TRQf is a function that takes, as parameters, the engine speed "Ne" and dynamic viscosity ν of the lubricating oil of the internal-combustion engine 10.

$$TRQ_f = C_1 \cdot Ne^2 + C_2 \cdot \nu + C_3 \tag{7}$$

where C1, C2, C3 are each a coefficient adapted by or during experiments or the like.

(3) Description of the Intake Air Pressure Estimation Model

The intake air pressure estimation model 66 has an intake air pressure map (not shown) for estimating an intake air pressure. This intake air pressure map is defined under a relationship among the intake air pressure, throttle angle "TA", the engine speed "Ne", and the valve timing "VVT" of the intake and exhaust valves. According to the configuration of such an intake air pressure estimation model, the intake air pressure can be acquired while minimizing the calculation load of the ECU 50. When calculating the intake air pressure in detail, the intake air pressure estimation model may be configured using a throttle model that estimates a flow rate of air which passes through the throttle valve 24 and a valve model that estimates a flow rate of air which passes through the air intake valve 32 (i.e., an in-cylinder intake air flow rate), instead of using such an intake air pressure map as described above.

(4) In-Cylinder Pressure Estimation Model

The in-cylinder pressure estimation model 68 is used for calculating in-cylinder pressures P under a situation in which no combustion is performed. In the in-cylinder pressure estimation model 68, the in-cylinder pressures P in each stroke of the internal-combustion engine 10 are calculated using Equations (8a) to (8d) shown below. That is to say, the in-cylinder pressure P during an intake stroke is first obtained, as in Equation (8a), from in-cylinder pressure map data "Pmap" derived from the intake air pressure map of the intake air pressure estimation model 66.

$$\text{Intake stroke } P = P_{map}(Ne, VVT, TA) \tag{8a}$$

$$\text{Compression stroke } P = \left(\frac{V_{bdc}}{V}\right)^{\kappa} \cdot P_{map} \tag{8b}$$

$$\text{Expansion stroke } P = \left(\frac{V_{tdc}}{V}\right)^{\kappa} \cdot P_C \tag{8c}$$

$$\text{Exhaust stroke } P = P_{ex} \approx P_{air} \tag{8d}$$

Next, in accordance with the equation of reversible adiabatic changes in a gas, the in-cylinder pressure P during a compression stroke can be expressed as in Equation (8b).

In above Equation (8b), $V_{BDC}$ denotes a stroke volume V existing when the piston 12 is present at an intake bottom dead center, and "$\kappa$" denotes a specific heat ratio.

As with the compression stroke, the in-cylinder pressure P during an expansion stroke can be expressed as in Equation (8c).

In above Equation (8c), $V_{TDC}$ denotes a stroke volume V existing when the piston 12 is present at a compression top dead center, and Pc denotes an in-cylinder pressure attained during an end of the compression stroke.

Also, it is assumed that, as shown in Equation (8d), the in-cylinder pressure P during an exhaust stroke is an internal pressure "Pex" in the exhaust passageway 22. The pressure "Pex" can be regarded to be essentially equal to an atmospheric air pressure "Pair". Therefore, the estimation model uses the atmospheric air pressure "Pair" as the in-cylinder pressure P attained during the exhaust stroke.

(5) Description of the Combustion Waveform Calculation Block

The combustion waveform calculation block 70 is used to calculate the in-cylinder pressure (combustion pressure) P during a combustion period from a middle phase of the compression stroke to a middle phase of the expansion stroke. The combustion waveform calculation block 70 calculates an estimated value of the combustion pressure P using Equation (9a) which is a relational expression based on a Weibe function, and Equation (10) described later herein.

$$\frac{dQ}{d\theta} = a \cdot \frac{k \cdot Q}{\theta_p} \cdot (m+1) \cdot \left(\frac{\theta - \theta_b}{\theta_p}\right)^m \cdot \exp\left\{-a \cdot \left(\frac{\theta - \theta_b}{\theta_p}\right)^{m+1}\right\} \tag{9a}$$

-continued $$\frac{dg(\theta)}{d\theta} \equiv \frac{d}{d\theta}\underbrace{\left(\exp\left\{-a \cdot \left(\frac{\theta - \theta_b}{\theta_p}\right)^{m+1}\right\}\right)}_{g(\theta)} \tag{9b}$$

$$= -a \cdot (m+1) \cdot \left(\frac{\theta - \theta_b}{\theta_p}\right)^m \cdot \exp\left\{-a \cdot \left(\frac{\theta - \theta_b}{\theta_p}\right)^{m+1}\right\}$$

The above Equation (9a) can be rewritten as follows:

$$\frac{dQ}{d\theta} = -\frac{k \cdot Q}{\theta_p} \cdot \frac{d}{d\theta}\left(\exp\left\{-a \cdot \left(\frac{\theta - \theta_b}{\theta_p}\right)^{m+1}\right\}\right) \tag{9c}$$

$$= -\frac{k \cdot Q}{\theta_p} \cdot \frac{dg(\theta)}{d\theta} \Leftrightarrow$$

$$\frac{dQ}{Q} \cdot \frac{1}{d\theta} = -\frac{k}{\theta_p} \cdot \frac{dg(\theta)}{d\theta}$$

Integrating both sides of Equation (9c) with respect to $\theta$ yields the following:

$$\int \frac{1}{Q} \cdot \frac{dQ}{d\theta} d\theta = -\frac{k}{\theta_p} \cdot \int \frac{dg(\theta)}{d\theta} d\theta \Leftrightarrow$$

$$\int \frac{1}{Q} dQ = -\frac{k}{\theta_p} \cdot \int dg(\theta) \Leftrightarrow$$

$$\log Q + C_2 = -\frac{k}{\theta_p} \cdot g(\theta) + C_1$$

$$\log Q = -\frac{k}{\theta_p} \cdot g(\theta) + C$$

(where C=C1−C2: C, C1, C2 are all integral constants)

$$Q = \exp\left(C - \frac{k}{\theta_p} \cdot g(\theta)\right) \tag{9d}$$

$$= \exp\left[C = \frac{k}{\theta_p} \cdot \exp\left\{-a \cdot \left(\frac{\theta - \theta_b}{\theta_p}\right)^{m+1}\right\}\right]$$

More specifically, the combustion waveform calculation block 70 first uses Equation (9a) to calculate a heat release rate dQ/dθ associated with a current crank angle θ.

Parameters "m", "k", "θb", and "a" in above Equation (9a) denote a shape coefficient, combustion efficiency, an ignition lag period, and a burning velocity, respectively. The burning velocity "a" here is a fixed value of 6.9. Each of the parameters uses a value adapted in advance. Also, Q denotes a heat release amount.

To calculate the heat release rate dQ/dθ by using Equation (9a), it is necessary to calculate the heat release amount Q. The heat release amount Q can be calculated by solving Equation (9a), a differential equation. In Equation (9b), therefore, a section equivalent to the Weibe function in Equation (9a) is first substituted by "g(θ)". This makes it possible to express Equation (9a) as Equation (9c). Next after integrating both sides of Equation (9c) with respect to the crank angle θ, developing Equation (9c) makes it possible to express the heat release amount Q as in Equation (9d). After this, the heat release rate dQ/dθ can be calculated by assigning to Equation (9a) the heat release amount Q that has been calculated in accordance with Equation (9d).

The heat release rate dQ/dθ and the in-cylinder pressure (combustion pressure) P can be expressed as in Equation (10) by using a relational expression based on the law of energy conservation. Accordingly, the combustion pressure P can be calculated by solving Equation (10) after assigning thereto the heat release rate dQ/dθ that has been calculated in accordance with Equation (9a).

$$\frac{dQ}{d\theta} = \frac{1}{\kappa - 1} \cdot \left( V \cdot \frac{dP}{d\theta} + \kappa \cdot P \cdot \frac{dV}{d\theta} \right) \quad (10)$$

Using the in-cylinder pressure estimation model 68 and combustion waveform calculation block 70 described above makes it possible, irrespective of whether the combustion is in progress, to acquire records of the in-cylinder pressures P of the internal-combustion engine 10. That is to say, this is possible by calculating the in-cylinder pressure P under a non-combustion status using the in-cylinder pressure estimation model 68, and calculating the in-cylinder pressure P under a combustion status using the combustion waveform calculation block 70.

A method of acquiring the records of the in-cylinder pressures P of the internal-combustion engine 10 is not limited to the above method and may be such a method that is shown with reference to FIG. 5, for example.

Figure 5A:
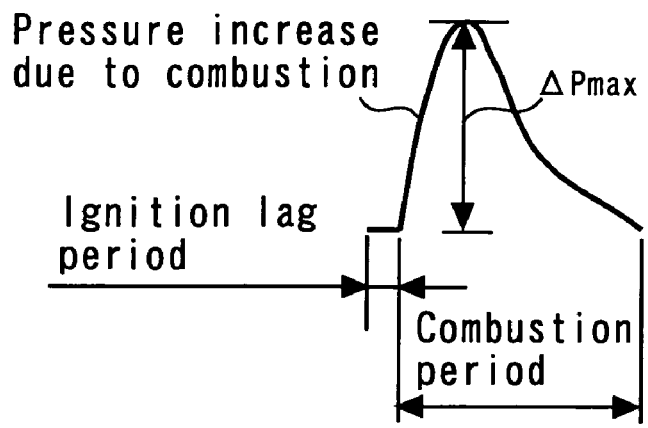
FIG. 5 is a diagram explaining a method applied as a modification to acquiring the records of the in-cylinder pressure P.

FIG. 5 is a diagram explaining a method applied as a modification described above. This method does not calculate the combustion pressure P for each required crank angle θ by using above Equations (9a) and (10). Instead, the method uses Equations (9a) and (10) beforehand to calculate such a combustion pattern that is shown in FIG. 5A, that is, only a variation in waveform of the in-cylinder pressure P due to combustion (in other words, an increase in pressure due to combustion).

Figure 5B:
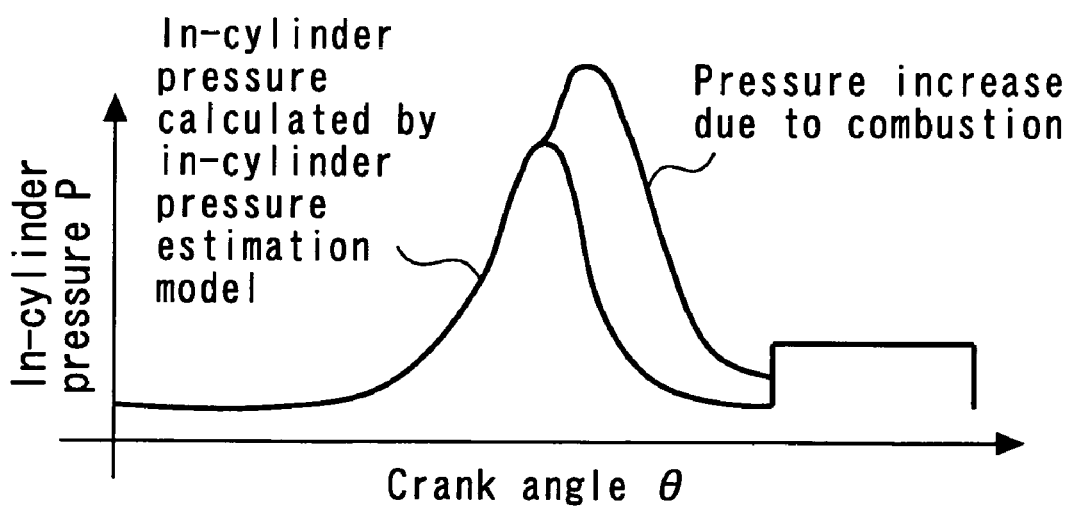

More specifically, a map is stored, in which the ignition lag period, combustion period, and "ΔPmax" (a deviation between a maximum pressure "Pmax" under a combustion state and a maximum pressure "Pmax0" under a non-combustion state), which are three parameters for determining the above combustion pattern. The map defines relationships among engine speed "Ne", air filling rate KL, valve timing VVT of the intake and exhaust valves, and ignition timing. In order to calculate a waveform corresponding to the increase in pressure due to combustion as a waveform approximated by combining simplified functions such as quadric functions, various coefficients concerning the approximated waveform are mapped under a relationship with the above engine speed "Ne". Next as shown in FIG. 5B, the waveform of the combustion-induced pressure increase that has been acquired with reference to such mappings is added to the value of the in-cylinder pressure P calculated by the in-cylinder pressure estimation model 68. Thus, the combustion pressure P is acquired.

(6) Description of the Atmospheric Pressure Correction Term Calculation Block

The atmospheric pressure correction term calculation block 72 includes a model that estimates an amount of cylinder-filling air, "Mc", taken into the cylinder (hereinafter, this model is called an "air model"). The air model calculates the amount of cylinder-filling air, "Mc", subject to Equation (11) below.

$$Mc = aPm - b \quad (11)$$

In above Equation (11), symbols "a" and "b" denote the coefficients adapted according to particular operating parameters such as the engine speed "Ne" and valve timing VVT. Also, "Pm" is an intake air pressure. For example, a value calculated by the intake air pressure estimation model 66 can be used.

The atmospheric pressure correction term calculation block 72 also includes a model that estimates an amount of fuel "Fc" taken into the cylinder (hereinafter, this model is called a "fuel model"). In view of a behavior of the fuel after being injected from a fuel injection valve 28, that is, in view of the events that part of the injected fuel sticks to, for example, an inner wall of the air intake port and that the sticking fuel is later gasified, if the amount of fuel sticking to the wall during a start of the fuel injection in the kth cycle is "fw(k)" and an actual amount of fuel injection in the kth cycle is "fi(k)", Equations (12a) and (12b) below can be used to express the amount of fuel sticking to the wall after the kth cycle, as "fw(k+1)", and the amount of fuel going into the cylinder during the kth cycle, as "fc".

$$f_w(k+1) = P(k) \cdot f_w(k) + R(k) \cdot f_i(k) \quad (12a)$$

$$f_c(k) = (1 - P(k)) \cdot f_w(k) (1 - R(k)) \cdot f_i(k) \quad (12b)$$

In above Equations (12), P denotes a sticking rate, which is more specifically a rate of the amount of fuel sticking to, for example, the inner wall of the air intake port, with respect to the amount of fuel injected, "fi". Also, R denotes a residual rate, which is more specifically a rate of the amount of sticking fuel, with respect to the amount of fuel which is sticking to, for example, the wall after the intake stroke. Use of Equations (12) makes it possible to calculate the above amount of fuel, "fc", for each cycle with both the sticking rate P and the residual rate R taken as parameters.

An estimated air/fuel (A/F) ratio can therefore be calculated using calculation results of the air model and the fuel model. The atmospheric pressure correction term calculation block 72 next calculates a steady-state deviation between the estimated A/F ratio and a measured value of the A/F ratio detected in the timing with consideration of a fuel transport delay from completion of injected-fuel combustion to an arrival of the burnt fuel at the air/fuel ratio sensor 52. This steady-state deviation is an error in the amount of cylinder-filling air, "Mc". If the steady-state deviation is significant, the atmospheric pressure correction term calculation block 72 regards the atmospheric pressure as inappropriate, and calculates an atmospheric pressure correction coefficient "kairp". More specifically, the air model inversely calculates an intake air pressure "Pm", and then on the basis of the calculated intake air pressure "Pm", calculates the atmospheric pressure correction coefficient "kairp" as a correction ratio relative to a standard atmospheric pressure "Pa0". The calculated atmospheric pressure correction coefficient "kairp" is used for the above-described intake air pressure estimation model 66 and in-cylinder pressure estimation model 68 to correct the intake air pressure "Pmap" and the exhaust pressure (atmospheric pressure "Pair"), respectively.

(7) Description of the Atmospheric Temperature Correction Term Calculation Block The atmospheric temperature correction term calculation block 74 calculates an in-cylinder pressure "Pth" by assigning the stroke volume V existing during the exhaust stroke, residual gas mass "m" (calculated from a clearance volume Vc existing at an exhaust top dead center), a gas constant R of a residual gas (burnt gas), and a measured atmospheric temperature "Tair", to an equation of state of an ideal gas. After that, a deviation between the calculated in-cylinder pressure "Pth" and the in-cylinder pressure P calculated by the in-cylinder pressure estimation model 68 is calculated. If the deviation is significant, a correction coefficient is calculated from the above deviation. This calculated correction coefficient is used for the above-described intake air pressure estimation model 66 to correct the intake air pressure "Pmap".

[Crankshaft Stop Position Control Using the Engine Model]

When a vehicle with an internal-combustion engine comes to a temporary stop, control (economical running control) may be executed for automatically stopping and restarting the internal-combustion engine. For a hybrid vehicle driven by an internal-combustion engine and a motor, such control may also be executed during powerup of a vehicle system (also, during a running state of the vehicle). In this Specification, the control performed in the above latter case is also called "economical running control").

There is the demand that, for smooth restarting of the internal-combustion engine during the above-described economical running control, an actual stop position of a crankshaft 16 (actual stop position of a piston 12) during an automatic stop of the internal-combustion engine should be accurately controlled to a desired stop position. The system of the present embodiment assumes that the engine model 60 described above is used as a stop position estimation model for estimating the stop position of the crankshaft 16 during economical running control. According to the engine model 60, the stop position of the crankshaft 16 during an automatic stop of the internal-combustion engine 10 can be acquired by calculating an estimated value of the crank angle θ at which the crank angular rotation speed dθ/dt becomes zero. In addition, a combustion cutoff engine speed at which the internal-combustion engine 10 is stopped with a desired stop position of the crankshaft 16 can be calculated by performing inverse calculations with the engine model 60. In this Specification, the stop position of the crankshaft 16 may be simply called the "crank stop position" or the "stop position of the crank".

There is a known technique designed so that when an internal-combustion engine is stopped automatically, an engine speed required for stopping supplying a fuel (combustion cutoff engine speed) is controlled so that a stop position of a crank is set to a target position. When such a technique is used, the stop position of the crank may deviate from its target stop position. In this case, the deviation is likely to be caused by a plurality of factors such as a variation in friction torque of a sliding section inside the engine. If these plural causes of the stop position error are not examined or clarified and the target stop position of the crank is learned with all those causes taken collectively, such learning will deteriorate in accuracy and in convergence. In addition, when the stop position of the crank is controlled by controlling the combustion cutoff engine speed, the effect of the friction becomes more significant than those of other causes.

In the system of the present embodiment, therefore, if there is a significant deviation between the actual stop position of the crank and the target stop position thereof, only the friction torque is adopted as a parameter to be learned, and the friction model 64 included in the foregoing engine model 60 is learned on the basis of the above-mentioned deviation of the crank stop position. And in the system of the present embodiment, other causes are adapted using sensor outputs. Thus, only the effects of the friction torque significantly influential on estimation of the crank stop position can be learned without the system being affected by any causes other than the friction torque. Estimation accuracy on the stop position of the crank can therefore be improved.

Next, a process according to the first embodiment is described in detail with reference to FIG. 6.

Figure 6:
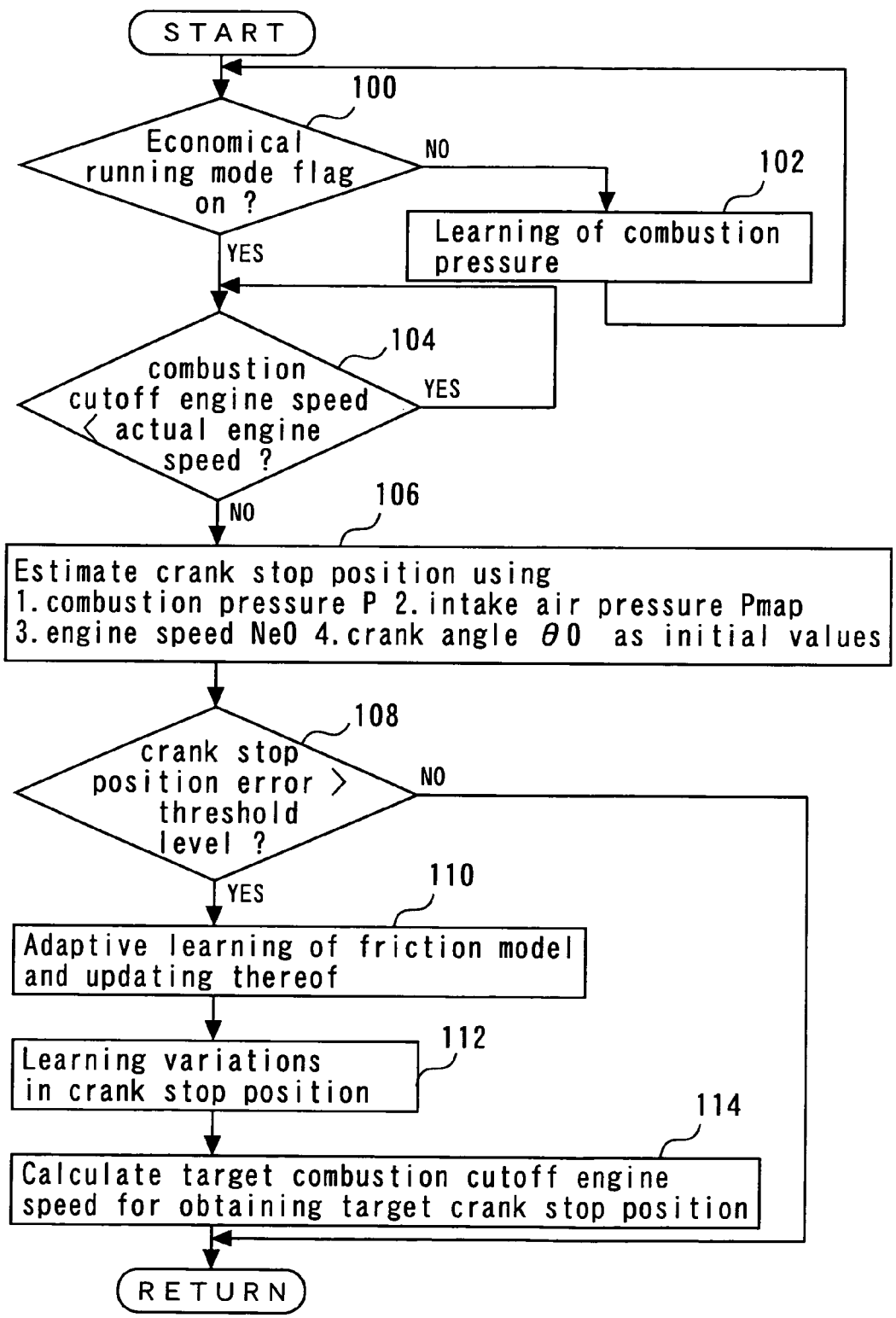
FIG. 6 is a flowchart of a routine executed by the ECU according to the first embodiment in order to realize control of the crank stop position using the engine model.

FIG. 6 is a flowchart of a routine executed by the ECU 50 according to the first embodiment in order to realize control of the crank stop position using the engine model 60.

(Process Relating to Step 100)

In the routine of FIG. 6, first, it is determined in step 100 whether an economical running mode flag is set to an ON state. If the ECU 50 judges that required economical running control execution condition is established, and more specifically, if the vehicle speed is zero and the internal-combustion engine 10 is in an idle state, the ECU sets the economical running mode flag to the ON state.

(Process Relating to Step 102)

If it is judged in above step 100 that the economical running mode flag is not in the ON state, learning of combustion pressures P is executed in step 102. In step 102, "Pmax" that is a maximum value of the combustion pressures P in one cycle is acquired and a value derived by averaging values of "Pmax" for several hundreds of cycles is saved. The minimum and maximum combustion pressures that are the minimum and maximum values among the values of "Pmax" for several hundreds of cycles are also saved. The present embodiment assumes that the average, minimum, and maximum values are saved in required timings when the internal-combustion engine 10 is in an idle state, for example at intervals of 10 rpm. Since changes in a degree of the combustion during the idle state of the internal-combustion engine 10 tend to be relatively significant, saving the minimum and maximum combustion pressures makes it possible to use these values as information on combustion nonuniformity in subsequent steps.

In step 102, the various parameters, such as "θb" and "θp", of the Weibe function in above Equation (9a) used for the calculation of the combustion pressure P by the combustion waveform calculation block 70 are modified (adapted) so that there is no deviation between the engine speed "Ne" value obtained by measurement based on the output from the crank angle sensor 40, and the engine speed "Ne" value arithmetically estimated by the crankshaft periphery motion equations computing block 62.

More specifically, the estimated engine speed "Ne" value required for compensation for a deviation between the estimated "Ne" value and the measured "Ne" value is assigned to above Equation (4e), whereby the input torque TRQ necessary to obtain the estimated "Ne" value required can be calculated. After this, the combustion pressure P required for obtaining the estimated "Ne" value required can be calculated using the calculated input torque TRQ and above Equations (5) and (6c). And as described above, the parameters in Equation (9a) are modified so that such combustion pressure P can be obtained. Using this technique makes it possible to achieve high calculation accuracy of the combustion waveform calculation block 70 by constantly feeding back the error between the measured "Ne" value and the estimated "Ne" value. The estimated value and measured value of the combustion pressure P can thus be accurately matched.

Although, during the process of step 102 described above, if there is an error between the measured and estimated engine speed "Ne" values, the parameters in Equation (9a) are determined to be incorrect and thus the parameters are modified. The technique for learning the combustion pressure P from the engine speed "Ne" data error is not limited to the above and may, for example, be the technique described below. That is to say, instead of the parameters in Equation (9a) being modified, the combustion pressure P may be calculated based on Equation (9a) and an equation created by adding a correction term that is a function of the crank angle θ (i.e., a correction term for incorporating the engine speed "Ne" data error) to the right side of Equation (10).

(Process Relating to Step 104)

In the routine of FIG. 6, if it is judged in step 100 that the economical running mode flag is ON, this judgment is followed by step 104 in which it is judged whether the actual engine speed "Ne" is higher than the currently set combustion cutoff engine speed "Ne0" for controlling the stop position of the crank.

(Process Relating to Step 106)

As a result, if it is not judged that the combustion cutoff engine speed "Ne0" is smaller than the actual engine speed "Ne", that is, if it is judged that the actual engine speed "Ne" has reached the combustion cutoff engine speed "Ne0", an estimated value of the crank stop position is calculated in step 106.

More specifically, the average combustion pressure value P acquired in the process of step 102 during the idle state, the intake air pressure "Pmax", the crank angle "θ0", and the engine speed (combustion cutoff engine speed) "Ne0" (=crank angular rotation speed dθ/dt) are first input as initial values in step 106. Then, respective estimated values of the crank angle θ and crank angular rotation speed dθ/dt are sequentially calculated using the crankshaft periphery motion equations computing block 62. Hereunder, details of this calculation technique will be described using Equations (13) and (14). Using this technique to solve the engine model 60 in the respective directions of arrows, shown in above FIG. 2, is termed "forward model computation" in this Specification.

First, the expression $(\delta f(\theta)/\delta \theta)=h(\theta)$ is given in the crank peripheral motion equation expressed by Equation (4e). Then, after Equation (5) has been assigned to the input torque TRQ in Equation (4e), Equation (4e) is made discrete to obtain Equation (13) shown below.

$$\begin{aligned}\{\theta(k+2)-\theta(k+1)\}-\\ \{\theta(k+1)-\theta(k)\}\end{aligned} = \left[\begin{array}{c} TRQ_e(\theta(k))- \\ TRQ_{fr}\left(\dfrac{\theta(k+1)-}{\theta(k)}\right)- \\ \dfrac{1}{2}h(\theta(k))\cdot\left(\dfrac{\theta(k+1)-}{\theta(k)}\right)^2 \end{array}\right] \Big/ f(\theta(k)) \quad (13)$$

Then, crank angle "θ0", crank angular rotation speed dθ/dt, and other values are given as initial calculation values during forward model computation based on Equation (13). Subsequently, a step count "k" is sequentially updated and thus the respective estimated values of the crank angle θ and crank angular rotation speed dθ/dt are sequentially calculated. Equation (13) can be expressed as in Equation (14a) by assigning a step count "k=1" to Equation (13).

If $k = 1$, then: (14a)

$$\begin{aligned}\{\theta(2)-\theta(1)\}-\\ \{\theta(1)-\theta(0)\}\end{aligned} = \left[\begin{array}{c} TRQ_e(\theta(0))- \\ TRQ_{fr}(\theta(1)-\theta(0))- \\ \dfrac{1}{2}h(\theta(0))\cdot(\theta(1)-\theta(0))^2 \end{array}\right] \Big/ f(\theta(0))$$

where, since $\dot{\theta}(1)=\{\theta(2)-\theta(1)\}$, $\dot{\theta}(0)=\{\theta(1)-\theta(0)\}$, it follows that:

$$\dot{\theta}(1)-\dot{\theta}(0) = \left[\begin{array}{c} TRQ_e(\theta(0))-TRQ_{fr}(\dot{\theta}(0)) \\ -\dfrac{1}{2}h(\theta(0))\cdot(\dot{\theta}(0))^2 \end{array}\right] \Big/ f(\theta(0)) \Leftrightarrow \quad (14b)$$

$$\dot{\theta}(1) = \left[\begin{array}{c} TRQ_e(\theta(0))-TRQ_{fr}(\dot{\theta}(0))- \\ \dfrac{1}{2}h(\theta(0))\cdot(\dot{\theta}(0))^2 \end{array}\right] \Big/ f(\theta(0))+\dot{\theta}(0) \Leftrightarrow \quad (14c)$$

$$\dot{\theta}(1) = \left[\begin{array}{c} TRQ_e(\theta(0))-TRQ_{fr}(\dot{\theta}(0))- \\ \dfrac{1}{2}h(\theta(0))\cdot(\dot{\theta}(0))^2 \end{array}\right] \Big/ f(\theta(0))+\dot{\theta}_0$$

$$\theta(1) = \theta(0)+\dot{\theta}(0) = \theta(0)+\dot{\theta}_0 \quad (14d)$$

Replacing a part of the crank angle "θ(k)" within above equation (14a) with associated crank angular rotation speed dθ(k)/dt yields Equation (14b). Next, expanding Equation (14b) makes it possible to express a crank angular rotation speed dθ(1)/dt for the step count "k=1", as in Equation (14c), by using the crank angle "θ0" and crank angular rotation speed dθ0/dt that have last been input as initial values. Additionally, integrating above Equation (14c) makes it possible to express crank angle "θ(1)" for the step count "k=1", as in equation (14d).

Next, when the above process is repeated until the step count "k" has reached N, that is, the crank angular rotation speed has become dθ(N)/dt=0, the crank angular rotation speed dθ(N)/dt=0 and the crank angle "θ(N)" are calculated. This means that the engine speed "Ne" (=0) and crank stop position during the stop of the internal-combustion engine 10 can be calculated using the above process.

During the process of step 106, the average value of the combustion pressure P is used as an initial value for the reasons below. That is, during a period from the time when it is judged that the actual engine speed "Ne" is equal to the combustion cutoff engine speed to the time when the combustion is actually cut off, a time equivalent to a phase difference of approximately 90° CA is required for reasons associated with hardware performance of the internal-combustion engine 10. A degree of drop of the engine speed "Ne" during this time varies depending on the value of the combustion pressure P existing before the combustion cutoff is started. More specifically, if the combustion pressure P existing before the combustion cutoff is started is high, the drop of the engine speed "Ne" is slow. Conversely, if the combustion pressure P is low, the drop of the engine speed "Ne" is fast. According to the process of step 106, effects of the combustion pressure P existing before combustion cutoff is started can be reflected to the estimated value of the crank stop position by using the average value of the combustion pressure P as an initial value.

In step 106, estimated values of the crank stop position when the maximum value and the minimum value of the combustion pressure P is the combustion pressure P existing before combustion cutoff is started, are also calculated. The minimum and maximum combustion pressures have been saved during the process of step 102. More specifically, the crank stop positions are calculated using input torque TRQ values corresponding to the saved minimum and maximum combustion pressures as initial values. According to this process, since the stop positions at the minimum and maximum combustion pressures are also calculated, variations in the stop position of the crank due to changes in the combustion state of the internal-combustion engine 10 can be learned.

The above-described process in step 106 may be substituted by a process described below. In step 106, the average value of the combustion pressure P that has been acquired beforehand during the idle state is used as an initial value, and the input torque TRQ values associated with the minimum and maximum combustion pressures are used as initial values in order to consider variations in the combustion state. Instead of these values being used, however, an average value of the combustion pressures P during required cycles are constantly calculated. When it is judged that the actual engine speed "Ne" has reached the combustion cutoff engine speed, the above average value existing immediately before the combustion cutoff is started may be used as an initial value.

(Process Relating to Step 108)

In the routine of FIG. 6, next, it is judged in step 108 whether the error between the estimated crank stop position value that was calculated in the process of step 106 and the measured crank stop position value that was detected by the crank angle sensor 40 is greater than a required threshold level. If it is judged that the above error is greater than the required threshold level, adaptive learning of the friction model 64 and then the updating thereof are executed in step 110.

Figure 7:
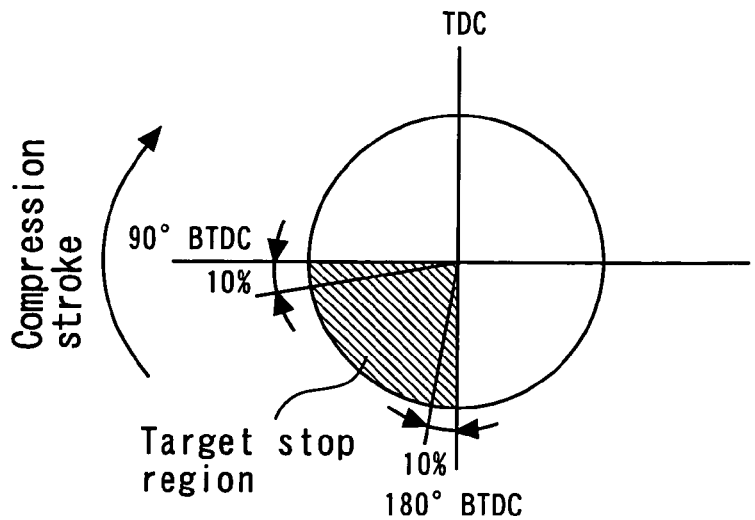
FIG. 7 is a diagram showing a target stop region of the crankshaft the ECU of FIG. 1 stores.

In step 108, initial judgment value for judging whether the adaptive learning of the friction model 64 should be started is also modified so that the above threshold level is made variable according to the particular operational state of the internal-combustion engine 10 or a particular deterioration state thereof. For this purpose, the ECU 50 stores data indicating such a target stop region of the crankshaft 16 that is defined as shown in FIG. 7. To restart the internal-combustion engine 10 properly during the execution of economical running control, the crankshaft 16 (piston 12) needs to be controlled to an appropriate stop position. As shown in FIG. 7, therefore, a region in a 90° CA-180° CA range before the top dead center is reached during the compression stroke is set as the target stop region of the crankshaft 16 by the ECU 50.

The above threshold level is changed if it is judged that at least one of the two crank stop positions at the minimum combustion pressure and the maximum combustion pressure calculated in the process of step 106 is deviated from required ranges of both sides of the above target stop region (e.g., the ±10% ranges of the target stop region shown in FIG. 7). More specifically, the stop position of the crank at the minimum combustion pressure and the stop position of the crank at the maximum combustion pressure are saved and then the above threshold level is changed according to a particular deviation between these stop positions of the crank. More specifically, if the deviation is significant, this indicates deteriorated computing accuracy of the engine model 60. Thus, the threshold level is reduced by increasing a frequency of learning of the friction model 64 to improve the computing accuracy of the engine model 60. The use of the technique described above makes it possible to improve estimation accuracy on the stop position of the crank by learning the effects of the friction torque in consideration of variations in the combustion level of the internal-combustion engine 10.

In addition, a technique for judging whether the friction model 64 requires learning in this routine is not limited to the process method of step 108. For instance, if the estimated value of the crank stop position is calculated using the method described above as a modification of the process of step 106, that is, using the method of adopting as an initial value the average combustion pressure value P obtained immediately before the combustion cutoff is started, when it is judged that the estimated stop position of the crank is not stayed within a required range (e.g., a range excluding the 10% sections of the target stop position, shown in FIG. 7), adaptive learning of the friction model 64 and then the updating thereof may be conducted in step 110.

Furthermore, a technique for making variable the threshold level according to the particular operational state or deterioration state of the internal-combustion engine 10 in this routine is not limited to the process method of step 108. For instance, the threshold level may be changed according to a particular deterioration level of the combustion within the internal-combustion engine 10 after judging this deterioration level according to the deviation between the crank stop position estimated using the method of adopting as an initial value the average combustion pressure value P obtained immediately before the combustion cutoff, and the stop position of the crank at the minimum or maximum combustion pressure. More specifically, it can be judged that the state in which there is a significant deviation between the stop position of the crank at the minimum combustion pressure and the stop position of the crank at the maximum combustion pressure is a state in which the combustion level of the internal-combustion engine 10 varies significantly. If the deviation is significant, therefore, it can be judged that the combustion of the internal-combustion engine 10 has deteriorated.

Accordingly, if the corresponding deviation is significant, that is, if the deterioration level of the combustion of the internal-combustion engine 10 is significant, the above threshold level for starting the learning of the friction model 64 may be increased. Use of this technique makes it possible to prevent erroneous learning by reducing the frequency of learning of the friction model 64. Additionally, although the use of such a technique requires separate learning of any changes in combustion pressure P (i.e., effects of variations in combustion level), the friction model 64 needs only to be updated during a phase of this step. The learning of the changes in combustion pressure P can be conducted in, for example, step 114 described later herein. Hereunder, the learning method will be described.

In the learning of the changes in combustion pressure P, a relationship between the changes in combustion pressure P and the deviations in the stop position of the crank is stored on the basis of calculated data on the stop positions of the crank at the minimum and maximum combustion pressures. This makes it possible to judge the deviation of the crank stop position is likely to occur according to the variation in combustion pressure P. On the basis of this deviation of the crank stop position, the target stop position to be used during the calculation of the combustion cutoff engine speed is modified in step 114 described below. According to such learning, a combustion cutoff engine speed at which the desired target stop position of the crank is obtained can be accurately calculated considering a variation in combustion level.

(Process Relating to Step 110)

In the routine of FIG. 6, as described above, if it is judged in step 108 that the above error is in excess of the required threshold level, adaptive learning of the friction model 64 and then the updating thereof are executed in step 110.

The friction torque TRQf value calculated by the friction model 64 is required for the estimation of the crank stop position. This calculated friction torque TRQf value depends on the engine speed "Ne". When combustion is stopped and the internal-combustion engine 10 is stopped, the engine speed "Ne" changes instantaneously and goes through various mapped points on the friction map of the friction model 64. Accordingly, it is difficult to instantaneously learn the friction model 64 when each such a change in the engine speed "Ne" occurs.

In step 110, therefore, the friction model 64 is learned and updated using the method described below. Incidentally, when the friction model 64 is learned, a deviation (error) between the crank angle θ calculated by the engine model 60 and the measured crank angle θ, and a deviation (error) between the crank angular rotation speed dθ/dt calculated by the engine model 60 and the measured crank angular rotation speed dθ/dt, are also compensated by the periodical feedback control of the PID controller 76. The compensations are conducted as a preparatory operation for the learning of the friction model 64 in step 110. More specifically, correction data obtained by multiplying the above deviations by a required feedback gain (hereinafter, the correction data is termed "PID correction data") is calculated by the PID controller 76, and the PID correction data is incorporated into the input data of the crankshaft periphery motion equations computing block 62. This process is conducted to prevent a friction torque error from affecting the engine speed "Ne". For example, if a deviation of the friction torque TRQr occurs at an engine speed "Ne" of 600 rpm, the friction torque error will be continued to be stored while the engine speed "Ne" is reduced. Therefore, the friction torque error will affect the engine at a region in which engine speed "Ne" is lower than 600 rpm. However, the above process prevents this effect.

The above process by the PID controller 76 makes it possible to improve the computing accuracy of the engine model 60 to minimize estimation errors in the crank angle θ and the crank angular rotation speed dθ/dt. The accuracy of the friction model 64, however, is not improved. In step 110, therefore, the PID correction data is used to conduct the following process to learn the friction model 64:

First, each time the friction torque goes through various settings of the engine speed "Ne" that have been assigned as the mapped points on the friction map of the friction model 64, more specifically, if, for instance, the combustion is cut off at 600 rpm, when the engine speed "Ne" goes down to a speed range such as 500 rpm and 400 rpm, the PID correction data is calculated and saved in an appropriate timing. At this time, however, PID correction data exactly corresponding to each mapped point is not acquired. Instead, in order to obtain correction data free of a noise-like behavior, average PID correction values that have been calculated a required number of times in neighborhood of various mapped points are saved or time-integrated PID correction data in the neighborhood of each mapped point is saved as PID correction data in the neighborhood of each mapped point. All deviations from the start of model computations (start of the combustion cutoff) are stored within I-term (integral term) components of the PID correction data. For calculation of the PID correction data in the neighborhood of each mapped point, therefore, all deviations that have been stored until the previous time are subtracted from the PID correction data calculated at this time.

Figure 8:
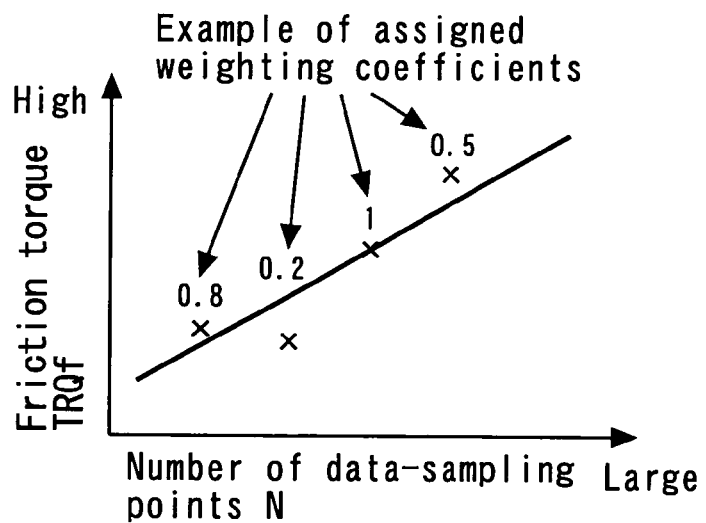
FIG. 8 is a diagram that explains the method implemented in step 110 to incorporate the PID correction data into values of each mapped point on the friction map of the friction model.

FIG. 8 is a diagram that explains the method implemented in step 110 to incorporate the PID correction data into values of each mapped point on the friction map of the friction model 64. FIG. 8 shows a relationship between the friction torque TRQf and the number of data-sampling points, N. Here, each mapped value on the friction map defined in the relationship between the cooling water temperature and the engine speed "Ne" is first plotted on the graph shown in FIG. 8. Next, a regression line (regression curve) with respect to the plotted points is calculated using a method of least squares. This regression line is defined under the relationship between the cooling water temperature "Thw" and the engine speed "Ne", and this line can be expressed as in Equation (15).

$$TRQ_f = aNe + bT_{hw} + c \tag{15}$$

where "a", "b", "c" are coefficients identified to minimize a distance from each plotted point to the regression line.

Next, the ECU 50 uses the friction model 64 to calculate the friction torque TRQf at the current cooling water temperature "Thw", for each engine speed "Ne" region in which the PID correction data is saved. After that, the friction torque TRQf values that the friction model 64 have calculated are plotted on the graph of FIG. 8. Next after these new plotting points have been added, the coefficients "a", "b", and "c" in above Equation (15) are identified once again and then the new regression line consequently obtained is used to calculate weighting coefficients for each mapped point.

The weighting coefficients are used to multiply the above PID correction data, and as shown in FIG. 8, each of the coefficients is changed according to a particular distance between each mapped point and the new regression line. More specifically, as the distance is shorter, each weighting coefficient is changed to a value closer to 1. Conversely, as the distance is longer, the weighting coefficient is changed to a value closer to 0. Next, the value of each mapped point is corrected using the data obtained by multiplying the PID correction data by the weighting coefficient. Assigning these weighting coefficients conducts corrections so that the PID correction data incorporated will be reduced at mapped points more distant from the regression line.

In this way, the above PID correction data obtained for each engine speed region is incorporated into the values of each mapped point. Even if the current water temperature value is an intermediate value of adjacent mappings, it is possible with the above-described method to give appropriate PID correction data to the values of each mapped point considering a relationship thereof with the adjacent mappings. In step 110, the friction model 64 is learned and updated by the above process.

(Process Relating to Step 112)

In the routine of FIG. 6, variations in the stop position of the crank are next learned in step 112. The ECU 50 constantly saves measured variations in the stop position of the crank at various combustion cutoff engine speeds, pursuant to a process flow of a routine independent of this routine. In step 112, if it is judged that the measured variation in the stop position of the crank at the current combustion cutoff engine speed has increased, this indicates an increased error in the friction torque information obtained from the friction model 64, so the value for judging whether the adaptive learning of the friction model 64 should be started is changed. More specifically, if it is judged that the corresponding variation has increased, the threshold level in step 108 is updated to a smaller value to improve the computing accuracy of the engine model 60.

(Process Relating to Step 114)

Next, a target combustion cutoff engine speed for modifying the stop position of the crank to the desired target stop position thereof is calculated and updated in step 114 using the friction model 64 that was updated in the process of step 110. It is possible, by executing this process of step 114, to acquire the target combustion cutoff engine speed which incorporates the effects of friction that have been learned during the series of process steps described above.

Three methods, for example, are applicable for implementing the process of step 114. A first possible method is inverse model computation, which is used to solve the above-described engine model 60 in a direction purely inverse to that of forward model computation. The inverse model computation relates to a behavior that occurs immediately before the internal-combustion engine 10 stops. In this state, effects inside the internal-combustion engine 10 are essentially monotonic and there are no significant fluctuations in engine speed. Accordingly, the target combustion cutoff engine speed (equivalent to the above-described initial crank angular rotation speed $d\theta/dt$ in the forward model computations) can be calculated by conducting inverse model computation on the engine model 60 with the target crank stop position (crank angle) of the crankshaft 16 as an initial value.

Figure 9:
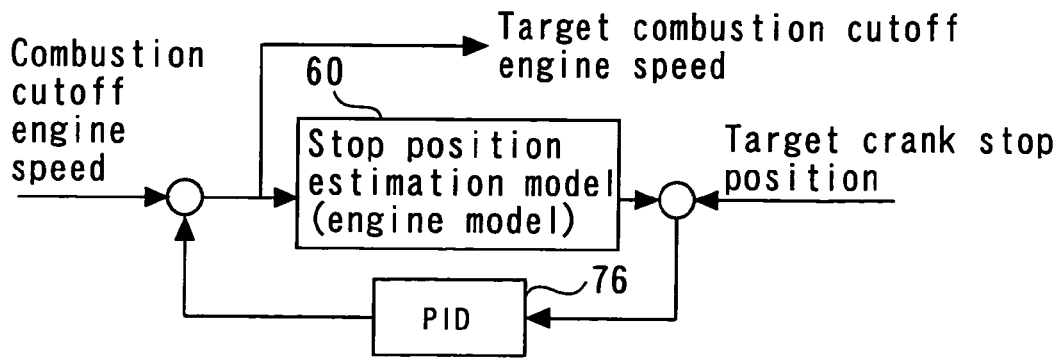
FIG. 9 is a block diagram explaining a calculating method of target combustion cutoff engine speed using the feedback control.

However, since the engine model 60 generally operates as a second-order lag system during forward model computation, a model inverse to the engine model 60 operates as a second-order differential system. For this reason, the inverse model computation system, since it is a divergent system, does not easily ensure stable computations. Accordingly, a second possible method is to using the feedback described referring to FIG. 9. In the method of FIG. 9, the deviation between the crank stop position calculated by the above-described engine model (stop position estimation model) 60, and the associated target stop position of the crank, is calculated and this deviation is incorporated into the combustion cutoff engine speed (initial crank angular rotation speed $(d\theta/dt)_0$), which is an input value of the engine model 60, by the PID controller 76. Repeating this process a plurality of times using the method shown in FIG. 9 makes it possible to acquire a combustion cutoff engine speed without the above deviation, that is, the target combustion cutoff engine speed corresponding to the target stop position of the crank. The engine model 60 at this time uses the friction model 64 after being learned during the process of step 110. Hence, the use of this method allows highly accurate calculation of the target combustion cutoff engine speed corresponding to the target stop position of the crank, by incorporating effects of the learned friction torque.

The above-described second method has the advantages that stable computation results can always be obtained and thus that reliable computation can be executed. At the same time, however, there are also the disadvantages that the computing load of the ECU 50 tends to increase and that the computation degrades in convergence. These make it difficult to perform frequent calculations. For these reasons, a method of using forward model computation results of the engine model 60 that uses the friction model 64 which were learned and updated in the process of step 110 will be described below as a third possible method.

Figure 10A:
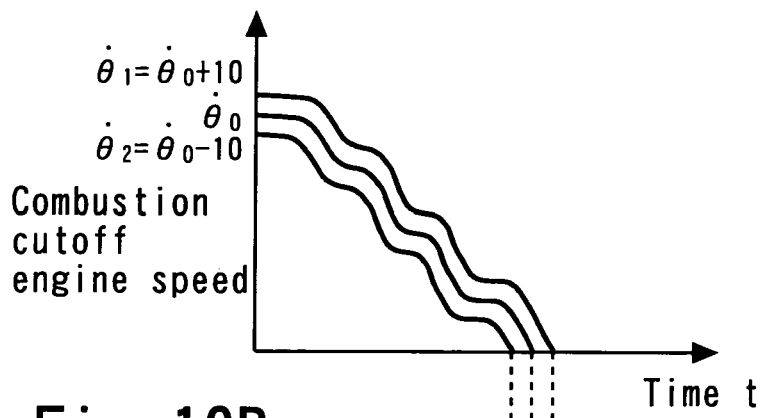
FIG. 10 is a timing chart for explaining the process conducted in step 114 of the routine shown in FIG. 6.
Figure 10B:
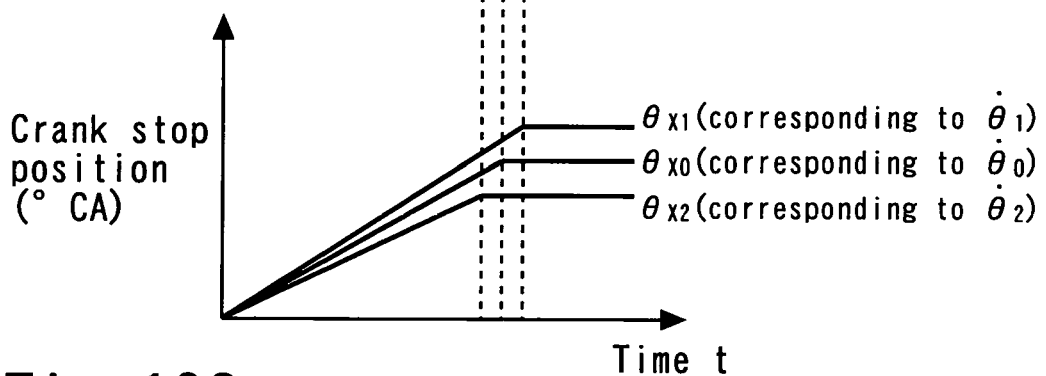
Figure 10C:
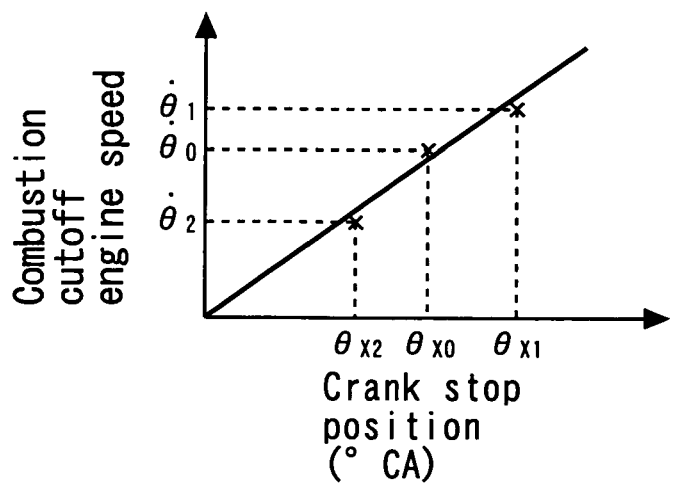

FIG. 10 is a timing chart for explaining the process conducted in step 114 of the routine shown in FIG. 6. More specifically, FIG. 10A shows the engine speed "Ne" reduced according to the particular value of the combustion cutoff engine speed; FIG. 10B shows the stop position of the crank changes in accordance with the value of the combustion cutoff engine speed; and FIG. 10C shows a relationship between the combustion cutoff engine speed and the crank stop position associated therewith.

Specifically, In step 114, forward model computation with the friction model 64 that was updated in the process of step 110 is first executed using as initial values the combustion cutoff engine speed "Ne0" (initial crank angular rotation speed $(d\theta/dt)_0$) and initial-crank angle $\theta 0$ that were input in step 106 during the start of this routine. The crank stop position "$\theta \times 0$" at the combustion cutoff engine speed corresponding to $(d\theta/dt)_0$ is calculated as a result. In addition to "$\theta \times 0$", crank stop positions "$\theta \times 1$" and "$\theta \times 2$" at combustion cutoff engine speed (initial crank angular rotation speed) $(d\theta/dt)_0+10$ and $(d\theta/dt)_0-10$, respectively, are calculated in step 114 by conducting similar forward model computations. The initial crank angle simultaneously input when the combustion cutoff engine speeds are corresponding to $(d\theta/dt)_0+10$ and $(d\theta/dt)_0-10$ is $\theta 0$ that is the same as for $d\theta 0/dt$. In addition, the $\pm 10$ rpm range in the foregoing description may be changed according to the particular deterioration level of the combustion and/or magnitude of a friction increase (depending on factors such as a deterioration of lubricating oil).

As shown in FIG. 10A, if different values are assigned to the combustion cutoff engine speed, this causes differences in the time required for the engine speed "Ne" to be reduced to zero. In addition, as shown in FIG. 10B, if different combustion cutoff engine speed values are assigned to obtain $(d\theta/dt)_0 \pm 10$ rpm, a final stop position of the crank varies in the range from $\theta \times 1$ to $\theta \times 2$. More specifically, an increase in the combustion cutoff engine speed shifts the stop position of the crank to a more forward position. Conducting the above process, therefore, makes it possible to obtain a range in which the crank stop position changes when the combustion cutoff engine speed is varied to obtain $(d\theta/dt)_0 \pm 10$ rpm.

Next in step 114, the target combustion cutoff engine speed is calculated from the relationship of the crank stop position variation range with respect to the combustion cutoff engine speed variation range that has been acquired in the manner described above so that the stop position of the crank match the desired target stop position thereof. More specifically, as shown in FIG. 10C, an approximated line is calculated from the relationship between the combustion cutoff engine speed and crank stop position data obtained by the above three kinds of forward model computations. Obtaining this approximated line makes it possible to calculate the target combustion cutoff engine speed corresponding to the desired target crank stop position of the crankshaft 16.

Also, the method described below is used to reduce the computing loads of the ECU 50 during the three kinds of forward model computations. More specifically, "$f(\theta(k))$" in above Equation (13) can be used as an essentially fixed value, compared with the magnitudes of other terms. In addition, "$h(\theta(k))$", although affected by the initial crank angle $\theta(0)$, is not affected by the initial crank angular rotation speed $((d\theta/dt)_0)$. Furthermore, "$TRQe(\theta(k))$" does not depend on those initial values and depends on the step count "k" existing until the computation is completed.

Since each of the above parameters in Equation (13) has the characteristics described above, only "$TRQf(\theta)$" on the right side of Equation (13) is calculated only for each of the above three initial values. Strictly, "$TRQe(\theta(k))$", "$h(\theta(k))$", and "$f(\theta(k))$" each depend on the crank angle $\theta$. In Equation (13), however, the term of "$TRQe(\theta(k))/f(\theta(k))$" and the term of "$\frac{1}{2} \cdot h(\theta(k)) \cdot (\theta(k+1)-\theta(k))^2/f(\theta(k))$" almost become fixed values if used as averages. Each parameter can therefore be calculated as a fixed value multiplied by a step count (e.g., if the combustion cutoff engine speed is $(d\theta/dt)_0$, each of those parameters can be calculated as a fixed value multiplied by a step count N.

In addition, during the three kinds of forward model computations, when the step count at which the crank angular rotation speed $d\theta/dt$ becomes zero for the combustion cutoff engine speed of $(d\theta/dt)_0$ is N, if the combustion cutoff engine speed changes to $((d\theta/dt)_0+10)$, the crank angular rotation speed $d\theta/dt$ at the step count N does not become zero. The crank angular rotation speed becomes zero when a step count Np is added to the step count N, that is, when a step count of (N+Np) is reached. Conversely if the combustion cutoff engine speed changes to $((d\theta/dt)_0-10)$, the crank angular rotation speed dθ/dt becomes zero at a step count of (N−Nm). The step counts Np, Nm are therefore saved. Accordingly, when, as described above, the term of "TRQe(θ(k))/f(θ(k))" and the term of "½·h(θ(k))·(θ(k+1)−θ(k))²/f(θ(k))" are each calculated as the fixed value multiplied by a step count, each can be calculated as the fixed value multiplied by a step count of (N+Np) for the combustion cutoff engine speed of ((dθ/dt)$_0$+10), or as the fixed value multiplied by a step count of (N−Nm) for the combustion cutoff engine speed of ((dθ/dt)$_0$−10).

According to the method described above, the target combustion cutoff engine speed corresponding to the target crank stop position of the crankshaft 16 can be calculated based on the forward model computation results of the engine model 60.

The deviation between the crank stop position computed by the engine model 60, and the actual stop position of the crank, is likely to be caused by the effects of the friction model 64 and the effects of other sections in the engine model 60. It is difficult, only by acquiring the deviation, to determine whether the above deviation between the stop positions of the crank is caused only by the effects of the friction model 64. In other words, it is difficult to determine whether the deviation is caused by the calculation of the friction torque TRQf or the calculation of the engine torque TRQe.

In contrast to this, according to the above-described routine of FIG. 6, the combustion pressure P is learned during the combustion in the internal-combustion engine 10. After this, the friction is learned immediately before the operation of the internal-combustion engine 10 is stopped after the completion of the combustion cutoff. According to the processes of the above routine, since variations in the stop position of the crank due to changes in combustion pressure are learned during the execution of the combustion, only the effects of the friction greatly influential on the stop position of the crank can be independently learned immediately before the stop of the internal-combustion engine 10, excluding other combustion-associated effects. The friction model 64 can be updated accordingly. As can be understood from the above, according to the engine model 60 in the present embodiment, accuracy of adaptive learning on friction can be improved since the effects of the friction, atmospheric pressure, atmospheric temperature, throttle valve angle, valve timing VVT, and other factors (the "required parameters" referred to in the present invention) that influence the stop position of the crank are appropriately modeled.

In addition, according to the processes of the above routine, the combustion cutoff engine speed for matching the stop position of the crank with the target stop position thereof can be directly calculated using a method such as inverse model computation with the learned and updated friction model 64 incorporated. Therefore, the engine model 60 capable of performing highly efficient arithmetic operations can be realized.

In the first embodiment, which has been described above, the "crank stop position calculating means" according to the second aspect of the present invention is implemented when the ECU 50 performs step 106.

Further, the "crank stop position judging means" according to the third aspect of the present invention is implemented when the ECU 50 performs step 108.

Further, the "target combustion cutoff engine speed calculating means" according to the fourth aspect of the present invention is implemented when the ECU 50 performs step 114.

Second Embodiment

A second embodiment of the present invention will now be described with reference to FIG. 11.

The system according to the second embodiment is implemented by adopting the hardware configuration shown in FIG. 1 and engine model 60 shown in FIG. 2 and by allowing the ECU 50 to execute a routine shown in FIG. 11 instead of the routine shown in FIG. 6.

The stop position of the crank in the internal-combustion engine 10 is appropriately controlled by using the above-described engine model 60 in order to improve the engine restartability during the execution of economical running control. To appropriately control the stop position of the crank, it is necessary to estimate the friction (friction torque TRQf) inside the internal-combustion engine 10 with high accuracy since the friction is a very influential factor. Magnitude of the friction usually depends on the lubricating oil temperature of the internal-combustion engine 10. The friction, however, is typically corrected based on a cooling water temperature, as with the friction model 64 described above. When there is a significant difference between the lubricating oil temperature and the cooling water temperature, since it is difficult to accurately correct the friction, the estimation accuracy on the stop position of the crank is deteriorated.

Accordingly, the present embodiment uses the method with reference to the routine shown in FIG. 11 described below. Also, the present embodiment makes it possible, by using the method, to determine the difference between the lubricating oil temperature and the cooling water temperature, even without a sensor for detecting the lubricating oil temperature. Thus, high estimation accuracy on the stop position of the crank during economical running control can be realized using a low-cost system configuration.

Detail Process in the Second Embodiment

FIG. 11 is a flowchart of the routine that the ECU 50 executes in the second embodiment of the present invention in order to realize above functionality. In the routine of FIG. 11, it is first judged in step 200 whether the internal-combustion engine 10 is currently in a steady operating state. This judgment step is conducted to obtain stable calculation data in the following process of step 202:

If it is judged in step 200 that the internal-combustion engine 10 is currently in a steady operating state, the engine torque TRQe is calculated in accordance with the foregoing Equation (4e) in the engine model 60. An average value A of the corresponding engine torques TRQe for a required number of cycles (e.g., several hundreds of cycles) is also calculated. The above calculations are conducted in step 202.

Next, a base torque B of the internal-combustion engine 10 is acquired in step 204. More specifically, with the map defined by the relationships among the amount of air intake, the engine speed "Ne", the air/fuel (A/F) ratio (fuel injection amount), the ignition timing, the indicated torque of the internal-combustion engine 10 is acquired. The base torque B is calculated by subtracting a friction torque and a load torque from the indicated torque. The indicated torque, the friction torque, and the load torque are the data measured beforehand in the state where the cooling water temperature and the lubricating oil temperature are correlated with each other.

Next, it is judged in step 206 whether an absolute value of a torque deviation ΔTRQ between the average value A of the engine torques TRQe calculated by the engine model 60 and base torque B is greater than a required judgment value. As a result, if it is judged that the absolute value of the torque deviation ΔTRQ is less than the required judgment value, that is, if it is judged that a current engine torque TRQe is a value close to the base torque B obtained under the correlated state of the cooling water temperature and the lubricating oil temperature, this indicates that a difference between the lubricating oil temperature and the cooling water temperature is not too significant. In this case, an execution of economical running mode is permitted in step 208.

If it is judged in step 206 that the absolute value of the torque deviation ΔTRQ is greater than the required judgment value, this indicates that, conversely to the above case, there is a significant variation in the friction torque TRQf acquired in the engine model 60, that is, that the difference between the lubricating oil temperature and the cooling water temperature is relatively significant. In this case, the execution of economical running mode is prohibited in step 210.

For convenience in description, the description below relates to a process in one routine based on one flowchart. However, if it is judged in step 206 that the absolute value of the torque deviation ΔTRQ is greater than the required judgment value, the following process may be conducted. That is to say, if it can be judged that the difference between the lubricating oil temperature and the cooling water temperature is relatively significant, a target combustion cutoff engine speed is calculated in step 212 by solving Equation (16) in which the above torque deviation (friction error) ΔTRQ is added to the right side of Equation (4e). In this case, the execution of economical running mode is permitted in step 208. In this way, the execution of the economical running mode may be continued after friction errors have been learned.

$$f(\theta)\dot{\theta} + \frac{1}{2}g(\theta)\dot{\theta}^2 = TRQ_{engine} - TRQ_{friction} - TRQ_{Load} + \Delta TRQ \quad (16)$$

According to the above-described routine of FIG. 11, the execution of economical running mode is prohibited if there is a relatively significant difference between the cooling water temperature and the lubricating oil temperature. That is to say, if the friction torque TRQf is significantly deviated and cannot be estimated accurately, the execution of economical running mode is prohibited. The stop position of the crank can therefore be accurately estimated using the engine model 60.

In addition, according to the other process set forth in the description of the above routine, if the difference between the lubricating oil temperature and the cooling water temperature is relatively significant, the target combustion cutoff engine speed is calculated by, as shown in Equation (16), solving the equation in which the above torque deviation ΔTRQ is added to the friction torque TRQf obtained from the friction model 64. Calculating the target combustion cutoff engine speed by using the Equation (16) in which the torque deviation ΔTRQ is added to the friction torque TRQf obtained from the friction model 64 is corresponding to correcting of the friction model 64 on the basis of the ΔTRQ value which is the error in the friction torque TRQf and then calculating the target combustion cutoff engine speed by using the corrected friction model 64. Hence, the process based on the above routine makes it possible to reflect the fact that the friction is affected by the cooling water temperature and the lubricating oil temperature. Thus, the stop position of the crank can be accurately estimated even when there is a relatively significant difference between the cooling water temperature and the lubricating oil temperature.

In the second embodiment, which has been described above, the "temperature difference judging means" according to the fifth aspect of the present invention is implemented when the ECU 50 performs step 206; and the "friction error calculating means" according to the fifth aspect of the present invention is implemented when the ECU 50 performs step 212.

Third Embodiment

A third embodiment of the present invention will now be described with reference to FIG. 12.

Figure 12:
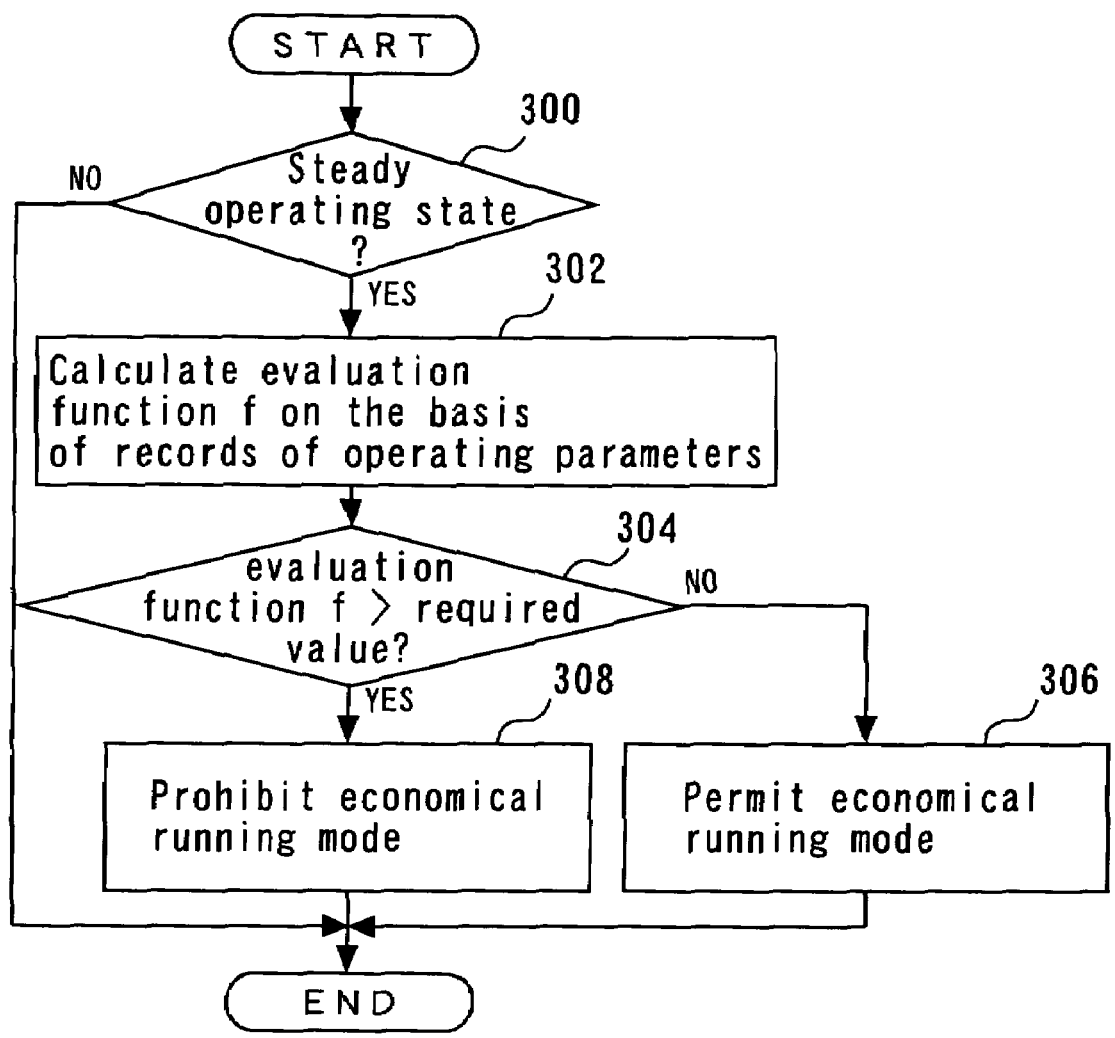
FIG. 12 is a flowchart of a routine executed by the ECU according to the third embodiment of the present invention.

The system according to the third embodiment is implemented by adopting the hardware configuration shown in FIG. 1 and engine model 60 shown in FIG. 2 and by allowing the ECU 50 to execute a routine shown in FIG. 12 instead of the routine shown in FIG. 11.

A system of the present embodiment differs from the system of the above-described second embodiment in terms only of a method of judging the difference between the cooling water temperature and the lubricating oil temperature. Hereunder, a description will be made mainly of the method in accordance with the routine shown in FIG. 12.

Detail Process in the Third Embodiment

FIG. 12 is a flowchart of the routine that the ECU 50 executes in the third embodiment of the present invention. In the routine of FIG. 12, if it is judged in step 300 that the internal-combustion engine 10 is currently in steady operation, an evaluation function "f" based on records of operating parameters is calculated in step 302. The evaluation function "f," which is expressed by Equation (17) below, is a function that allows for calculation of a typical heat release amount due to combustion.

$$f = \int KL \cdot K_{Ne} \cdot K_{abyf} \cdot K_{aop} \quad (17)$$

As expressed by above Equation (17), the evaluation function "f" is assigned as a value obtained by time-integrating, over a required period, a value obtained by multiplying an air-filling rate KL by a correction coefficient "Kne" depending on an engine speed "Ne", a correction coefficient "Kabyf" depending on an air/fuel (A/F) ratio, and a correction coefficient "Kaop" depending on an ignition timing. The difference between the cooling water temperature and the lubricating oil temperature increases immediately after the internal-combustion engine continues to operate with a high power output for a long time, such as immediately after driving under severe conditions.

Increases in the air-filling rate KL increase a heat release amount. In addition, if, as shown in Equation (17), the air-filling rate KL is multiplied by the correction coefficient "Kne" corresponding to the engine speed "Ne", information on velocities of combustion gases can be obtained. Furthermore, multiplying KL×Kne by the correction coefficient "Kabyf" depending on the air/fuel (A/F) ratio provides appropriate combustion temperature information, depending on whether the air/fuel (A/F) ratio is rich or lean. Moreover, multiplying KL×Kne×Kabyf by the correction coefficient "Kaop" depending on the ignition timing provides information on whether the engine has knocked can be obtained from information indicative of whether the ignition timing has been delayed. Using the evaluation function "f" that allows for the above effects, therefore, makes it possible to judge how severely the vehicle has been driven. Each value of correction coefficients K are defined so that the evaluation function "f" takes a larger value as the vehicle is driven more severely.

Next, it is judged in step 304 whether the value of the evaluation function "f" is larger than a required judgment value. As a result, if it is judged that the evaluation function "f" is smaller than the judgment value, that is, if it is judged that the vehicle is currently not in a status such as immediately after driving under severe conditions, and thus that the difference between the cooling water temperature and the lubricating oil temperature is relative small, an execution of economical running mode is permitted in step 306.

However, if it is judged in step 304 that the evaluation function "f" is greater than the judgment value, that is, if it is judged that the vehicle is currently in a status such as immediately after driving under severe conditions, and thus that the difference between the cooling water temperature and the lubricating oil temperature is relative significant, the execution of economical running mode is prohibited in step 308

According to the above-described routine of FIG. 12, the difference between the cooling water temperature and the lubricating oil temperature can also be judged, even without a sensor for detecting the lubricating oil temperature.

The above third embodiment has been described assuming that if it is judged that the evaluation function "f" is greater than the judgment value, the execution of economical running mode is prohibited in step 308. However, instead of the economical running mode being prohibited, if such a judgment is conducted, the friction model 64 may be corrected in accordance with a torque deviation ΔTRQ and then a target combustion cutoff engine speed may be calculated to permit the execution of the economical running mode. This process is essentially the same as that of step 112 in the routine of FIG. 10.

The invention claimed is:

1. The stop position control apparatus for the internal-combustion engine which is adapted to control a stop position of a crankshaft by controlling a combustion cutoff engine speed at which combustion of an internal-combustion engine is to be stopped, comprising:
   a friction model which calculates a friction of the internal-combustion engine; and
   crank stop position calculating means for calculating an estimated value of the stop position of the crankshaft on the basis of required parameters including the friction;
   wherein the crank stop position calculating means corrects the estimated value of the stop position of the crankshaft on the basis of the friction calculated by the friction model.

2. The stop position control apparatus for the internal-combustion engine according to claim 1, further comprising:
   crank stop position judging means for judging the stop position of the crankshaft;
   wherein, if it is judged that the stop position of the crankshaft is outside a required error range, the apparatus learns the friction model and updates the friction model, on the basis of a deviation between an estimated value of the stop position of the crankshaft and a measured value of the stop position of the crankshaft.

3. A stop position control apparatus for an internal-combustion engine which is adapted to control a stop position of a crankshaft by controlling a combustion cutoff engine speed at which combustion of an internal-combustion engine is to be stopped, comprising:
   a friction model which calculates a friction of the internal-combustion engine; and
   a crank stop position calculating device for calculating an estimated value of the stop position of the crankshaft on the basis of required parameters including the friction;
   wherein the crank stop position calculating device corrects the estimated value of the stop position of the crankshaft on the basis of the friction calculated by the friction model.

* * * * *

UNITED STATES PATENT AND TRADEMARK OFFICE
CERTIFICATE OF CORRECTION

PATENT NO. : 7,809,493 B2  
APPLICATION NO. : 12/086002  
DATED : October 5, 2010  
INVENTOR(S) : Noriyasu Adachi Page 1 of 1

It is certified that error appears in the above-identified patent and that said Letters Patent is hereby corrected as shown below:

On the Title Page, item [57] ABSTRACT, line 8, after "estimated" insert --data--.

| Column | Line | |
|---|---|---|
| 6 | 6 | Change Equation (1a) to read as follows: |

-- $\theta_1 = \theta, \theta_2 = \theta + \pi. \theta_3 = \theta + 2\pi, \theta_4 = \theta + 3\pi$      (1a)--.

10     40-43     Change Equation (9d) to read as follows:

$$Q = \exp\left(C - \frac{k}{\theta_p} \cdot s(\theta)\right) \quad (9d)$$

$$-- \quad = \exp\left\{C - \frac{k}{\theta_p} \cdot \exp\left(-a \cdot \left(\frac{\theta - \theta_b}{\theta_p}\right)^{m-1}\right)\right\} \quad --.$$

27     38     Change "The stop position" to --A stop position--;  
                    Change "the internal-" to --an internal- --.

Signed and Sealed this  
Twelfth Day of April, 2011

David J. Kappos  
*Director of the United States Patent and Trademark Office*